US010172176B2

(12) United States Patent
Nguyen et al.

(10) Patent No.: US 10,172,176 B2
(45) Date of Patent: *Jan. 1, 2019

(54) METHOD AND SYSTEM FOR INITIAL SYNCHRONIZATION AND COLLISION AVOIDANCE IN DEVICE TO DEVICE COMMUNICATIONS WITHOUT NETWORK COVERAGE

(71) Applicant: BlackBerry Limited, Waterloo (CA)

(72) Inventors: Nam Nguyen, Hanoi (VN); Yufei Wu Blankenship, Kildeer, IL (US); Sagar Dhakal, Richardson, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/672,600

(22) Filed: Aug. 9, 2017

(65) Prior Publication Data

US 2017/0339738 A1  Nov. 23, 2017

Related U.S. Application Data

(60) Continuation of application No. 15/204,588, filed on Jul. 7, 2016, now Pat. No. 9,775,187, which is a
(Continued)

(51) Int. Cl.
*H04W 76/14* (2018.01)
*H04W 4/70* (2018.01)
(Continued)

(52) U.S. Cl.
CPC .......... *H04W 76/14* (2018.02); *H04B 7/2656* (2013.01); *H04W 4/70* (2018.02);
(Continued)

(58) Field of Classification Search
None
See application file for complete search history.

(56) References Cited

U.S. PATENT DOCUMENTS 8,121,068 B2   2/2012   Zhu
8,379,662 B2   2/2013   Imamura
(Continued)

FOREIGN PATENT DOCUMENTS

| EP | 1465362 | 10/2004 |
| EP | 1879419 | 1/2008 |
| JP | 09-084114 | 3/1997 |

OTHER PUBLICATIONS

International Search Report and The Written Opinion dated Nov. 10, 2014; in PCT patent application No. PCT/US2014/050391.
(Continued)

*Primary Examiner* — Hong S Cho
(74) *Attorney, Agent, or Firm* — Fish & Richardson P.C.

(57) ABSTRACT

A method at a first device for enabling a device-to-device wireless link, the method detecting whether a presence signal of a second device is received over a first time period, the presence signal of the second device having a time-slot boundary; and if the presence signal of the second device is not detected, initiating a time-slot boundary by the first device including: transmitting a first presence signal of the first device in a selected time-slot; and checking for an acknowledgment to the first presence signal.

24 Claims, 17 Drawing Sheets

Related U.S. Application Data continuation of application No. 14/833,992, filed on Aug. 24, 2015, now Pat. No. 9,445,397, which is a division of application No. 13/962,708, filed on Aug. 8, 2013, now Pat. No. 9,210,690.

(51) Int. Cl.
*H04W 72/04* (2009.01)
*H04W 8/00* (2009.01)
*H04W 56/00* (2009.01)
*H04W 74/08* (2009.01)
*H04W 72/02* (2009.01)
*H04B 7/26* (2006.01)

(52) U.S. Cl.
CPC ........... *H04W 8/005* (2013.01); *H04W 56/00* (2013.01); *H04W 72/02* (2013.01); *H04W 72/0446* (2013.01); *H04W 74/085* (2013.01)

(56) References Cited

U.S. PATENT DOCUMENTS

| | | | |
|---|---|---|---|
| 9,184,825 B2 | 11/2015 | Kimura | |
| 2003/0043768 A1* | 3/2003 | Chang | H04B 1/70735 370/335 |
| 2004/0196872 A1* | 10/2004 | Nakamura | H04B 7/2678 370/512 |
| 2005/0201340 A1 | 9/2005 | Wang | |
| 2005/0227615 A1 | 10/2005 | Sakoda | |
| 2006/0153132 A1* | 7/2006 | Saito | H04B 7/155 370/329 |
| 2007/0280156 A1 | 12/2007 | Kwon et al. | |
| 2008/0273522 A1 | 11/2008 | Luo | |
| 2011/0216682 A1* | 9/2011 | Xu | H04L 1/0027 370/311 |
| 2011/0255527 A1 | 10/2011 | Chowdhary et al. | |
| 2011/0268101 A1 | 11/2011 | Wang | |
| 2012/0039287 A1 | 2/2012 | Ko et al. | |
| 2012/0087273 A1 | 4/2012 | Koo et al. | |
| 2013/0279382 A1* | 10/2013 | Park | H04W 74/085 370/311 |
| 2013/0301491 A1 | 11/2013 | Bashar | |
| 2014/0064263 A1* | 3/2014 | Cheng | H04W 8/005 370/350 |

OTHER PUBLICATIONS

3GPP TR 22.803, "Feasibility study for Proximity Services (ProSe)," V 12.0.0, Dec. 2012.

"Study on LTE Device to Device Proximity Services," 3GPP TSG RAN Meeting #58 RP-122009, Dec. 2012.

Roop Mukherjee, Bill Gage, Robert Novak, U.S. Appl. No. 13/888,944, "Contention free device signalling for eNB-less device communication." filed May 7, 2013.

Francois Baccelli, el. al, "On the Design of Device-to-Device Autonomous Discovery," 2012 Fourth International Conference on Communication Systems and Networks (COMSNETS), Jan. 2012.

Office Action issued in Canadian Application No. 2,920,657 dated Feb. 14, 2017; 4 pages.

Communication Pursuant to Article 94(3) EPC issued in EP Application No. 14755284.8 on Apr. 11, 2017; 6 pages.

Communication Pursuant to Article 94(3) EPC issued in EP Application No. 14755284.8 dated Nov. 27, 2017; 5 pages.

Japan Patent Office, Notification of Reasons for Refusal for Application No. 2016-533476, drafted on Jul. 2, 2018 (machine translation provided).

Qualcomm Incorporated, "Techniques for D2D Communication", 3GPP TSG-RAN WG1 #73 R1-132504, May 2013.

Huawei, Hisilicon, "RAN2 considerations for D2D communication", 3GPP TSG RAN WG2 Meeting #83 R2-132757, Aug. 2013.

NEC Group, "Aspects of synchronisation for D2D communication", 3GPP TSG RAN WG1 Meeting #74bis R1-134241, Oct. 2013.

LG Electronics, "Discussion on Synchronization for D2D Communications", 3GPP TSG RAN WG1 Meeting #75 R1-135488, Nov. 2013.

Blackberry UK Limited, "Configuration and Reception of D2D Synchronization and Control Channels", 3GPP TSG-RAN WG1 #75 R1-135554, Nov. 2013.

\* cited by examiner

METHOD AND SYSTEM FOR INITIAL SYNCHRONIZATION AND COLLISION AVOIDANCE IN DEVICE TO DEVICE COMMUNICATIONS WITHOUT NETWORK COVERAGE

This application is a continuation of U.S. application Ser. No. 15/204,588, filed on Jul. 7, 2016, which is a continuation of U.S. application Ser. No. 14/833,992, filed on Aug. 24, 2015, which is a divisional of U.S. application Ser. No. 13/962,708, filed on Aug. 8, 2013, the entire contents of which are hereby incorporated by reference.

FIELD OF THE DISCLOSURE

The present disclosure relates to wireless device-to-device (D2D) communications, and in particular relates to device-to-device communications without a controlling network infrastructure node.

BACKGROUND

In current wireless network scenarios, a device will typically communicate with a network infrastructure node such as a base station or an access point that the device is being served by, which will then allow communication to other devices, including those served by that same network infrastructure node, or to devices served by other network infrastructure nodes. However, such communication may not be possible in certain areas where wireless network coverage from an infrastructure node does not exist, for example, remote areas without wireless network deployment or areas which have suffered a destruction of wireless network infrastructure. Further, even where wireless network coverage exists, communications using a network infrastructure node may not be desirable. For example, in general communication systems, a direct D2D transmission of data may provide more efficient utilization of radio resources than current networks.

Device-to-device communications are communications between two wireless devices or user equipments (UEs), where the communication proceeds directly between UEs and does not proceed through a network infrastructure node. Uses for D2D communications may be for both emergency and non-emergency situations. For example, first responders and public safety members may use D2D communications to communicate between devices. This may be useful in situations where there is no network coverage, such as remote areas or inside a building. However, even in network coverage areas, in some cases D2D communications are desirable in public safety situations.

In non-emergency situations, friends that are in close proximity to each other may wish to communicate directly with each other. Other cases include human-to-machine interaction, such as parking meters talking to mobile wireless devices within range to help a user of a mobile wireless device find a free parking space. Machine-to-machine communication is possible as well, for example, temperature/humidity/pressure sensor communicates recorded data to a controller device. Other examples are possible. The devices involved may be stationary or mobile.

The operation of a device for communicating with other devices without a network infrastructure element however has challenges, since there is no central control for such communications.

BRIEF DESCRIPTION OF THE DRAWINGS

The present disclosure will be better understood with reference to the drawings, in which.

DETAILED DESCRIPTION OF THE DRAWINGS

Figure 1:
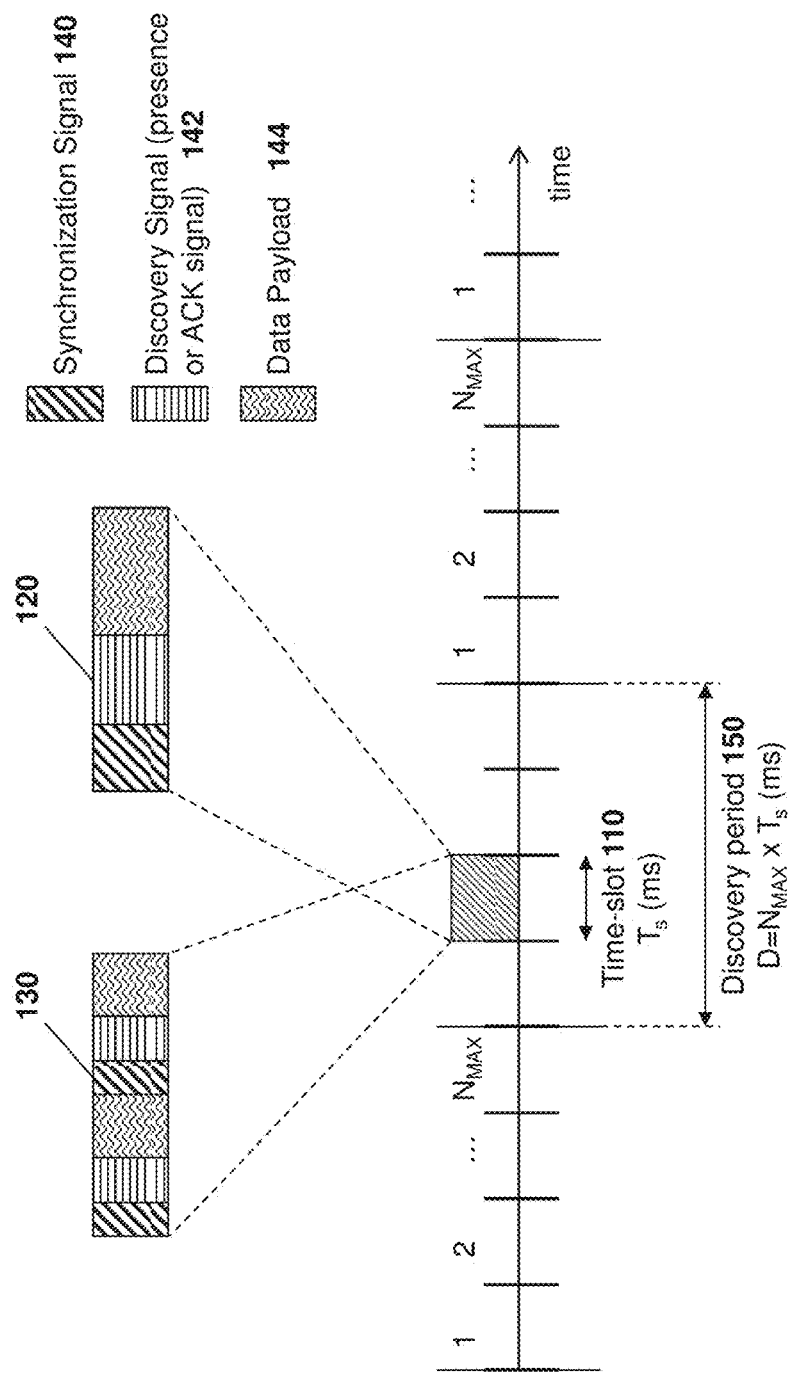
FIG. 1 is a block diagram illustrating the provision of a presence signal within a time-slot.

The present disclosure provides a method at a first device for enabling a device-to-device wireless link, the method comprising: detecting whether a presence signal of a second device is received over a first time period, the presence signal of the second device having a time-slot boundary; and if the presence signal of the second device is not detected, initiating a time-slot boundary by the first device including: transmitting a first presence signal of the first device in a selected time-slot; and checking for an acknowledgment to the first presence signal.

The present disclosure further provides a device for enabling a device-to-device link, the device comprising: a processor, wherein the processor is configured to: detect whether a presence signal of a second device is received over a first time period, the presence signal of the second device having a time-slot boundary; and if the presence signal of the second device is not detected, initiate a time-slot boundary by the first device including: transmitting a first presence signal of the first device in a selected time-slot; and checking for an acknowledgment to the first presence signal.

The present disclosure further provides a method at a first device for enabling a device-to-device wireless link, the method comprising: listening for a presence signal on a channel, the presence signal comprising at least one sequence; and upon detection of the presence signal, transmitting an acknowledgement to the presence signal; and aligning to a time-slot boundary associated with the presence signal by utilizing at least one sequence of the presence signal.

The present disclosure further provides a device for enabling a device-to-device wireless link, the device comprising: a processor, wherein the processor is configured to: listen for a presence signal on a channel, the presence signal comprising at least one sequence; and upon detection of the presence signal, transmit an acknowledgement to the presence signal; and align to a time-slot boundary associated with the presence signal by utilizing at least one sequence of the presence signal.

The present disclosure further provides a method at a device for enabling a device-to-device wireless link, the method comprising: listening for a presence signal from another device on a channel; and transmitting a presence signal on the channel to establish a time-slot boundary, wherein the transmitting of the presence signal enables another device to detect such presence signal and to align to the established time-slot boundary.

The present disclosure further provides a device for enabling a device-to-device wireless link, the device comprising: a processor, wherein the processor is configured to: listen for a presence signal from another device on a channel; and transmit a presence signal on the channel to establish a time-slot boundary, wherein the transmitting of the presence signal enables another device to detect such presence signal and to align to the established time-slot boundary.

Device to device applications and services, also referred to herein as proximity-based applications and services, represent an emerging social and technological trend. In this regard, the $3^{rd}$ Generation Partnership Project (3GPP) Long Term Evolution (LTE) architecture is evolving to include such services, which would allow the 3GPP industry to serve the developing market and, at the same time, serve urgent needs of various Public Safety communities.

However, the implementation of a network between devices without a central controller has various issues. One issue with regard to device to device communications is the discovery of devices outside network coverage and the ability for devices to communicate with each other. In particular, currently there is no way to achieve reliable discovery of devices in an ad hoc network having no controlling network element. Such discovery allows devices in the network to be continually aware of the presence of other devices with which they can communicate directly. Further, for transmission of a signal, presently there is no clear way to establish a common time frame synchronization for long term evolution orthogonal frequency division multiplexing (OFDM) or single carrier frequency division multiple access (SC-FDMA) symbol transmission or reception in the absence of any network infrastructure.

A further issue for D2D communications relates to fixed length transmissions, where time-slots are used. Periodic discovery signals transmitted by devices may take up less than one time-slot (TS), and currently it is not clear how to establish the time-slot boundaries and radio frame timing to align the transmission of numerous devices in an ad-hoc network.

As used herein, a time-slot is a generalized term of a fixed length time window that may be used by a device to communicate with other devices, and differs from a "slot" as used by LTE specifications.

A further issue is that currently devices do not detect and resolve potential uplink transmission conflict for device to device communications when two or more devices both select the same initial time-slot for transmission. Therefore, a collision resolution methodology is provided herein.

The present disclosure therefore provides for the initialization of a wireless network for device to device communication outside of network coverage. Specifically, the present disclosure addresses how a group of devices can discover each other, define time-slot boundaries, assign transmission time-slots to each device, avoid and resolve collisions, and synchronize with each other, among other features. These initialization steps occur before devices are able to have data communication between each other. Further, the embodiments described herein apply to either fully connected networks or partially connected networks, such as where not all devices are able to receive transmissions from all other devices in the network.

While the present disclosure provides examples utilizing the LTE architecture, the embodiments described herein are not limited to such architecture, and other network architectures could equally be used. The techniques and examples provided herein could therefore be expanded to other technologies besides 3GPP long term evolution (LTE).

When a system is in a discovery stage, devices are not connected to a network, and thus no synchronization may have been established. In accordance with one embodiment of the present disclosure, to address this, devices may periodically transmit presence signals (PS) with fixed length that can be transmitted within time-slots. The configuration of such presence signals is provided below.

Upon receiving an identifiable PS, an acknowledgement signal (ACK) may be sent back to the device transmitting the PS. The ACK, as described below, is designed so that multiple receivers can respond to the PS by transmitting the same ACK. Further, in accordance with the present disclosure an algorithm is provided to align devices to the same time-slot boundary. Note that while the description here focuses on acknowledgement (ACK) as an example, the same transmission can often be designed to transmit negative acknowledgement (NACK) as well. For instance, the transmission can use two possible sequences (e.g., all-zeros sequence for ACK vs all-ones sequence for NACK). While NACK can be utilized to support PS transmission as well, for simplicity the discussion primarily focuses on ACK. It is intended that usage of NACK in network establishment is covered by the procedures and protocols described herein.

In accordance with a further embodiment, to obtain time frequency synchronization for LTE OFDM/SC-FDM symbol transmission/reception, the present disclosure provides the use of an existing primary synchronization signal (PSS) as used in LTE to detect symbol boundaries within a time-slot.

In accordance with a further embodiment, TS level synchronization may be achieved through a procedure that allows the first transmit device to establish a TS boundary reference for other devices in the network. By doing this, a slotted time division duplex (TDD) system is established.

In accordance with a further embodiment, in order to detect the transmission of multiple PS signals on a same time-slot, a random hopping secondary synchronization signal (SSS) scheme is used to assign a new SSS to a presence signal in every cycle. Here cycle refers to a time frame used by relevant devices as time references to transmit and receive signals. For example, certain signals (e.g., a broadcast signal) may repeat regularly every cycle, or every integer number of cycles. In this application, cycle is also referred to as a frame. A receiving device can correlate to the possible SSSs one by one and detect the multiple transmissions of PS signals.

In accordance with a further embodiment, a protocol is provided for UEs to periodically transmit presence signals and to get acknowledgments from neighbors. For example, a transmitting device will continue to utilize a time-slot that it is currently using if it receives at least one ACK, and will jump to a new free time-slot if it does not receive an ACK for a certain duration. Once the system converges to a stable state, all UEs can periodically broadcast their PS free of collisions. Thus the above algorithm may be totally distributed.

As used herein, a mobile device, device, user equipment, or other such term is interchangeable and refers to a device that is capable of establishing device-to-device communications.

Reference is now made to FIG. 1. In order to allow devices in the network to be continually aware of the presence of other devices with which they can communicate, in accordance with one embodiment of the present disclosure, each device transmits a substantially periodic presence signal. Though the presence signal may collide with the presence signals of other devices when a device first starts transmitting, after a contention resolution procedure as described below, the PS transmitted by each device is unique in a time-slot. In this way, each device is individually identifiable by its peer devices for as long as the device is active and each device is able to obtain a dedicated time-frequency resource without continuous collision resolution.

A discovery signal, in accordance with the present disclosure, involves one of two signals. A first signal that forms a discovery signal is the presence signal, which is sent out by a device. A device broadcasts its PS to notify its presence and further to reserve a time-slot. A second discovery signal is an acknowledgement signal (ACK) received by the device. All or a subset of devices that decode the PS broadcast an ACK to indicate approval of the time-slot.

Thus, as illustrated in FIG. 1, a particular time-slot 110 may have either one unit per time-slot, as shown by reference 120 or two units per time-slot as shown by reference 130. In either of the embodiments of FIG. 1, each unit contains a synchronization signal 140, a discovery signal 142, which may comprise either a presence signal or an acknowledgement, and a data payload 144.

A plurality of time-slots are combined to form a discovery period 150 and the discovery period time for the periodicity of the discovery signals is defined to be the number of time-slots per discovery period ($N_{Max}$) times the time ($T_S$) per time-slot. The discovery period can have the same length as a frame. The frame is used as time reference for both initial discovery and subsequent data communication.

Thus, in accordance with the present disclosure, the discovery signals are repeated on each discovery period. Each discovery period is composed of $N_{Max}$ time-slots, where a device can either transmit or receive a radio-frame on any given time-slot. The $N_{Max}$ may represent the maximum number of UEs that can be discovered in accordance with the designed architecture.

Before devices discover each other, the data payload time unit 144 remains empty.

In accordance with the present disclosure, two system designs are described. However, such systems are merely examples and other systems could also be used. In a first system, a one carrier frequency time division duplex system is provided, where two units per time-slot are used. In a second system, a two carrier frequency time division duplex system is used where there is only one unit per time-slot.

One Carrier Frequency TDD System

In accordance with one embodiment, a UE operates in a D2D mode using only one carrier frequency (e.g., either an uplink channel or downlink channel, as for example defined in LTE) for both transmission and reception. As used herein, uplink is defined similarly to a cellular system where uplink refers to transmissions from a device. Similarly, downlink involves signals received at the device.

Figure 2:
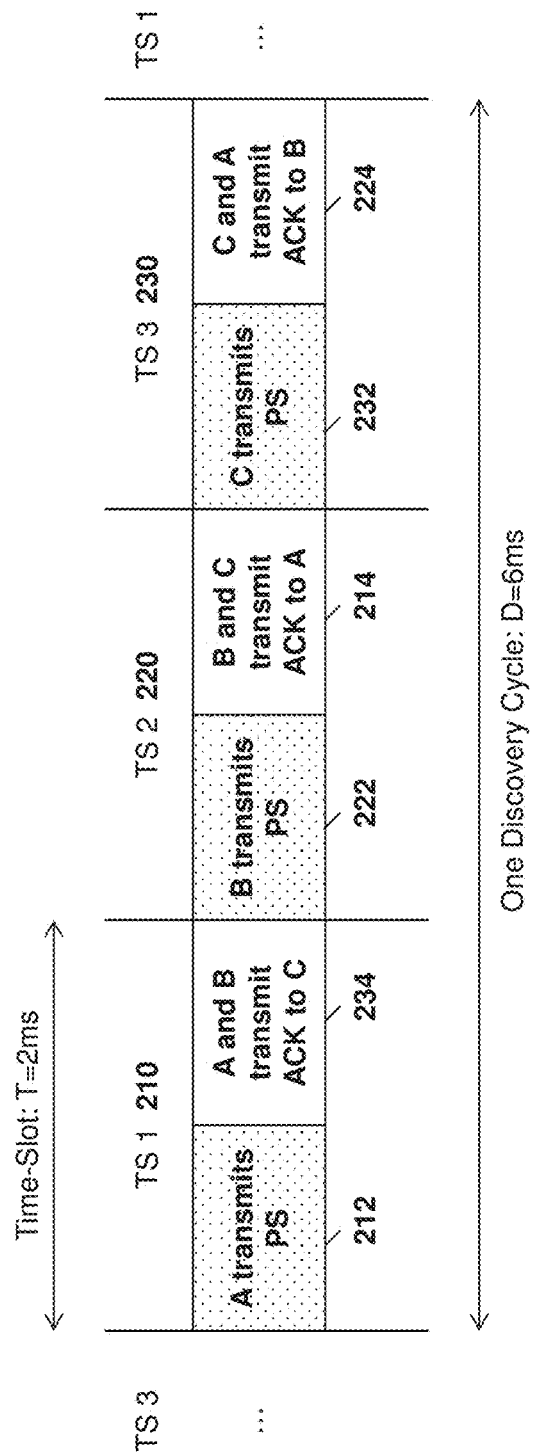
FIG. 2 is a block diagram showing a time-slot in which a first radio frame is used to transmit a presence signal and a second radio frame is used to transmit an acknowledgement.

Reference is now made to FIG. 2, which shows an embodiment of a channel in accordance with one embodiment of the present disclosure in which each time-slot is divided into a transmission portion and a reception portion from the point of view of a given device. Typically other portions of the time-slot could be used for other purposes such as data or synchronization signals, and thus the embodiment of FIG. 2 is merely a simplification.

As seen in FIG. 2, three time-slots are provided where $N_{MAX}$ from above is defined as three. Thus, the system of FIG. 2 has converged to a solution with three devices in which the time-slots repeat themselves.

In accordance with FIG. 2, each time-slot has two transmission instances where the first transmission instance is for the PS signal and the second transmission instance is for the ACK signal. In accordance with one embodiment, each time-slot may be 2 ms long. Based on LTE specifications, a system is provided such that a UE may transmits its PS and should receive an ACK a certain number of milliseconds later. For example, in accordance with the embodiment of FIG. 2, the ACK is received 3 ms after the transmitting of the signal.

In particular, in a first time-slot 210 a PS signal is sent by a mobile device A shown by reference 212. 3 ms later, as shown by reference 214, device B and/or C sends an acknowledgement if they received the PS signal correctly.

In time-slots 220 a device B transmits its PS signal in the first transmission instance, as shown by reference 222, and 3 ms later, as shown by transmission instance 224, devices C and/or A send an ACK if the PS signal is received correctly.

Similarly, in time slots 230, in a transmission instance 232 device C transmits its PS signal and in transmission instance 234, devices A and/or B send their ACK.

The discovery period in this case is 6 ms, where three time-slots are provided with each time-slot having 2 ms.

Variations of the above are possible. Further, the timing could change and the examples above are provided merely for illustrative purposes.

Several variations of the embodiment of FIG. 2 may include the variability of the periodicity of the discovery signals including the PS and ACK for a given device. In one embodiment, the periodicity of the discovery signal may be short ($N_{Max}$) when a device is attempting an initial connection. However, once established, the discovery signal periodicity may be switched to a long period (for example $4 \times N_{Max}$) to reduce the number of transmissions or receptions of the discovery signal. The reduction in the number of transmissions or receptions however means that devices that are trying to connect to the network will need to monitor the channel for a longer period to ensure that the transmission instance that device selects is not occupied by another device.

In a further variation, not all peer devices need to respond to a device's PS transmission. For example, in some embodiments only peer devices related to the transmitting device in some way may need to send an ACK in response to the transmitting device's PS. This may be particularly useful, for example, when device-to-device connections are stably established. For example, the response may be based on a device identifier once devices have been assigned an identifier in an ad hoc network where devices with certain identifiers need to respond in certain subframes. In another embodiment, a timing based relationship may be utilized such that devices with certain PS transmitting opportunity coming up may need to send ACKs. Other examples are possible.

Figure 3:
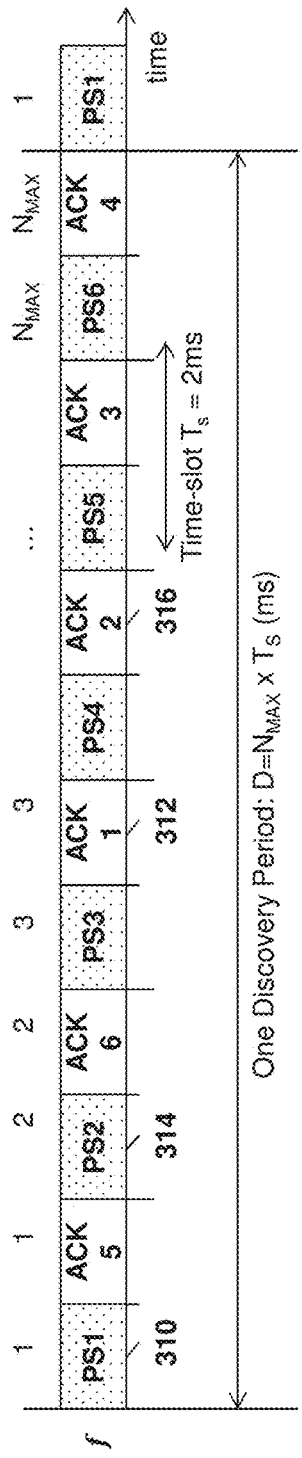
FIG. 3 is a block diagram showing a single carrier is used for transmitting presence signals and acknowledgements for a discovery period.

Similarly, referring to FIG. 3, a system is shown in which $N_{Max}=6$ and the acknowledgement occurs 5 ms after the transmitting of the PS. In particular, as seen in FIG. 3, in transmission instance 310 a first device transmits a PS and this is acknowledged in radio frame 312. Similarly, in transmission instance 314 a second device transmits a PS and this is acknowledged in transmission instance 316. Other transmission instances are similarly used for transmission and acknowledgement.

After a discovery period of 12 ms in the example of FIG. 3, the process repeats itself.

The above embodiments of FIGS. 2 and 3 assume that each time-slot is full. In other embodiments, some time-slots may be unoccupied, e.g., to allow for new devices to be added.

Two Carrier Frequencies TDD System

Figure 4:
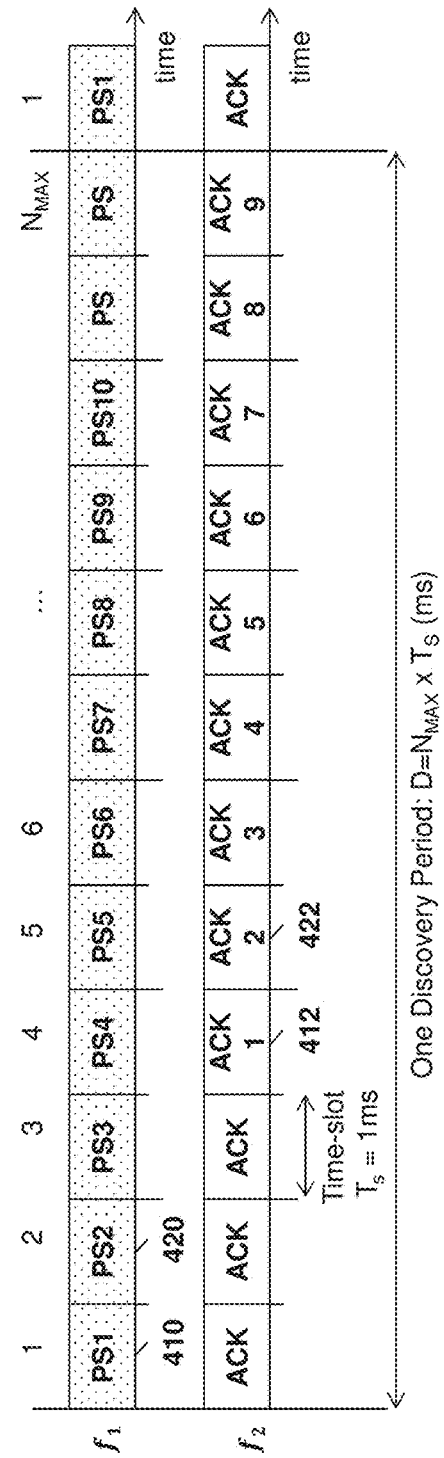
FIG. 4 is a block diagram showing two carriers, a first used for transmitting presence signals and a second used for transmitting acknowledgements.

In an alternative embodiment to that described with reference to FIGS. 2 and 3 above, a UE may have both uplink and downlink channels, where each of the channels is capable of both transmission and reception. In this case, for D2D communications one carrier may be allocated for PS signals and the other channel/carrier may be allocated for ACK signals. Reference is now made to FIG. 4.

In the example of FIG. 4, a time slot is defined as 1 ms and 12 time-slots are shown for each of the PS and ACK channels. In a time-slot 410, a first device transmits its PS and this is acknowledged 3 ms later as shown by reference 412.

Similarly, in the second time-slot a second device transmits its PS signal, as shown by reference numeral 420 which is then acknowledged in time slot 422.

Time-slots can be occupied or unoccupied and the acknowledgement may occur 3 ms later in the corresponding time-slots on the acknowledgement channel.

The timing relationship between the PS and the ACK may vary depending on the implementation. Thus, a PS is not necessarily responded to in the ACK in the closest time. A PS is typically acknowledged by an ACK signal several time-slots away in order to allow for propagation time and transmission/reception processing times. The exact timing relationship between a PS and an ACK may adopt various values, such as a 4 ms separation used in LTE frequency division duplex (FDD) systems in one embodiment. Other values are also possible.

At any given time-slot a UE can either be in transmitting mode or receiving mode. In a transmitting mode a UE either transmits a PS signal or an ACK signal. Similarly, in a receiving mode a UE detects the PS signals, the ACK signals and collisions of PS signals or an empty time-slot. Collisions may occur when two or more UEs transmit a PS in one time-slot. Moreover, due to the fact that a UE cannot transmit and receive at the same time (full-duplex UE is not assumed here), a UE in a transmitting mode cannot detect a collision with other UEs. However, those UEs that are in the receiving mode could detect such collision. In one embodiment, the UEs in the receiving mode will not send any notification, but the transmitting UE may use a confidence measure as described below to detect the collision. In other embodiments, the UEs in the receiving mode may duly notify the transmitter UEs.

By partitioning the radio resource into PS time-slots and ACK time-slots as described with reference to FIG. 4, a feedback mechanism is accommodated in accordance with the present disclosure. In particular, if the UE in the receiving mode detects a collision, then it does not send back an ACK signal in one embodiment. However, if there is no collision, the receiver UE may broadcast an acknowledgement signal on an ACK time-slot after a $T_{ACK}$ duration of time. The transmitter UE must wait to receive the ACK signal before securing its time-slot. If the transmitter UE does not receive an ACK, in ideal conditions it may assume that a collision has occurred and thus find a new time-slot to retransmit the PS. In non-ideal conditions, if an ACK is not received, confidence by the transmitting UE in the time-slot may decrease until it falls below a threshold, at which point the transmitting UE will look for a new time-slot to retransmit the PS.

Frame Structure and Signal Design

In accordance with one embodiment of the present disclosure, the primary synchronization signal (PSS) may be used for dual purpose of both a preamble for a time/frequency synchronization and also as a primary presence signal. The secondary synchronization signal (SSS) may be used as secondary presence signal and as a temporary device identifier.

According to current LTE standards, three possibilities exist for PSS. For device-to-device communication the PSS value can be utilized to identify a device-to-device cluster. In particular, a cluster is a group of devices that are able to establish direct links amongst them. In one example, each device in the group is a one-hop neighbor of all other devices in the group in accordance with the present disclosure.

As there are 168 possible values of an SSS in LTE, the SSS may be utilized as a type of temporary device identifier to enable enhanced collision detection techniques as described below.

On each discovery cycle, a device may transmit a randomly picked SSS code word. During the discovery phase, if a collision occurs between presence signals of two devices, then other devices are capable of determining that a collision has occurred. Further, the other devices may be able to tell how many SSS signals have collided.

While the above describes 3 and 168 sequences for PSS and SSS, respectively, other numbers of sequences may be possible, depending on the implementation. Instead of having 168 sequences for identification, only 40 may be needed as a given number of devices simultaneously active for a cluster may not be expected to exceed 40, for example. Using the smaller sequence space reduces the processing burden on receiving devices.

Figure 5:
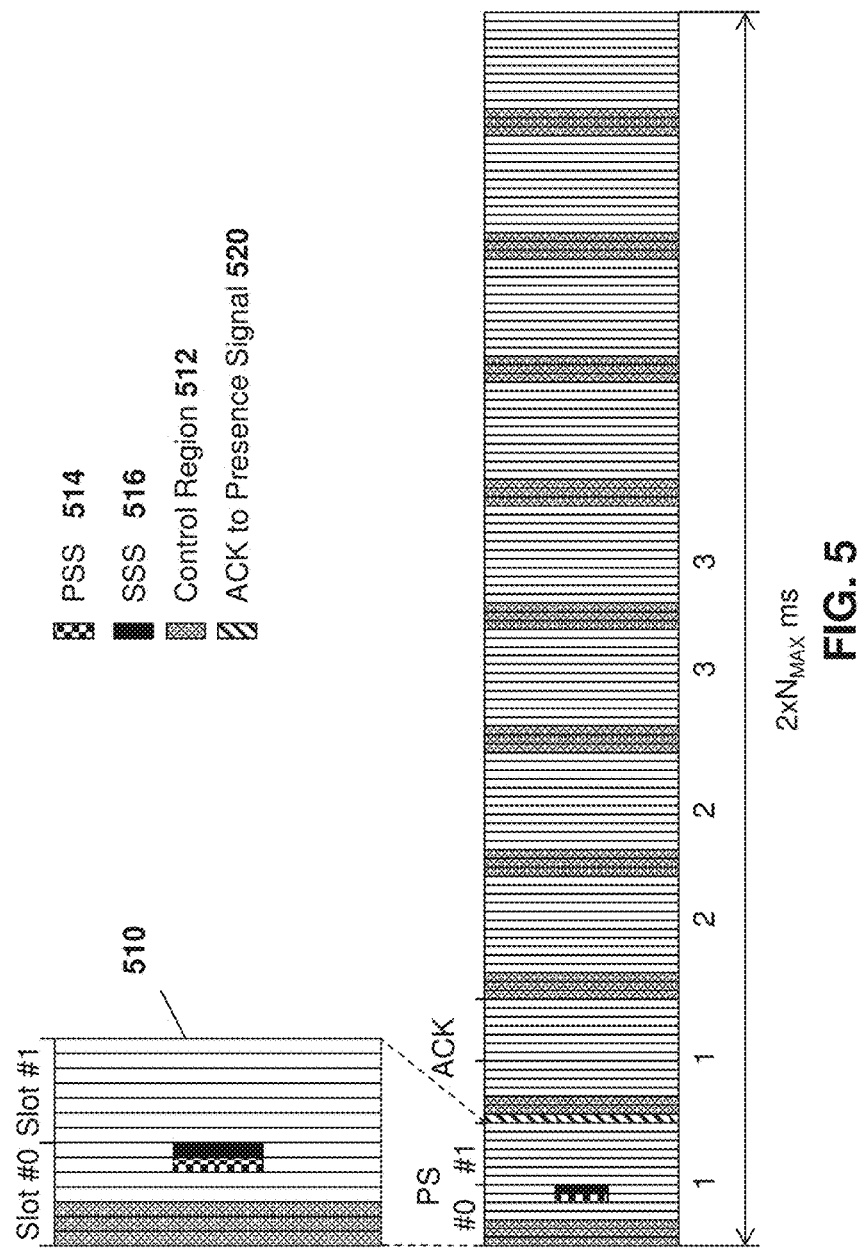
FIG. 5 is a block diagram showing radio frames for transmission of primary synchronization signals, second synchronization signals, and acknowledgements.

From the point of view of a single device, the frame structure is shown with regard to FIG. 5 below, where a first device is used as an example. In the example of FIG. 5 a first device transmits on a first subframe. Here the subframe as defined in LTE is used as an example, which is analogous to a time-slot in general. The subframe is shown enlarged at reference numeral 510.

In the first subframe, the first 3 symbols are used for a control region 512. Further, since the device is transmitting in that subframe, the PSS 514 as well as a randomly chosen SSS 516 may be transmitted in the subframe.

In the next subframe, if an ACK is required then the ACK may sent as shown by reference numeral 520. Note that while in the figures, ACK is shown as transmitted in the subframe right after the subframe with PS transmission, it is understood that other time delays for ACK transmission are possible, e.g., ACK is sent 4 subframes after the subframe with PS transmission.

Thus, in accordance with FIG. 5, the presence signal of a given device is always transmitted in an even-numbered subframe, while the ACK response is transmitted in an odd-numbered subframe. However, other timing relationships are possible as defined above.

Figure 6:
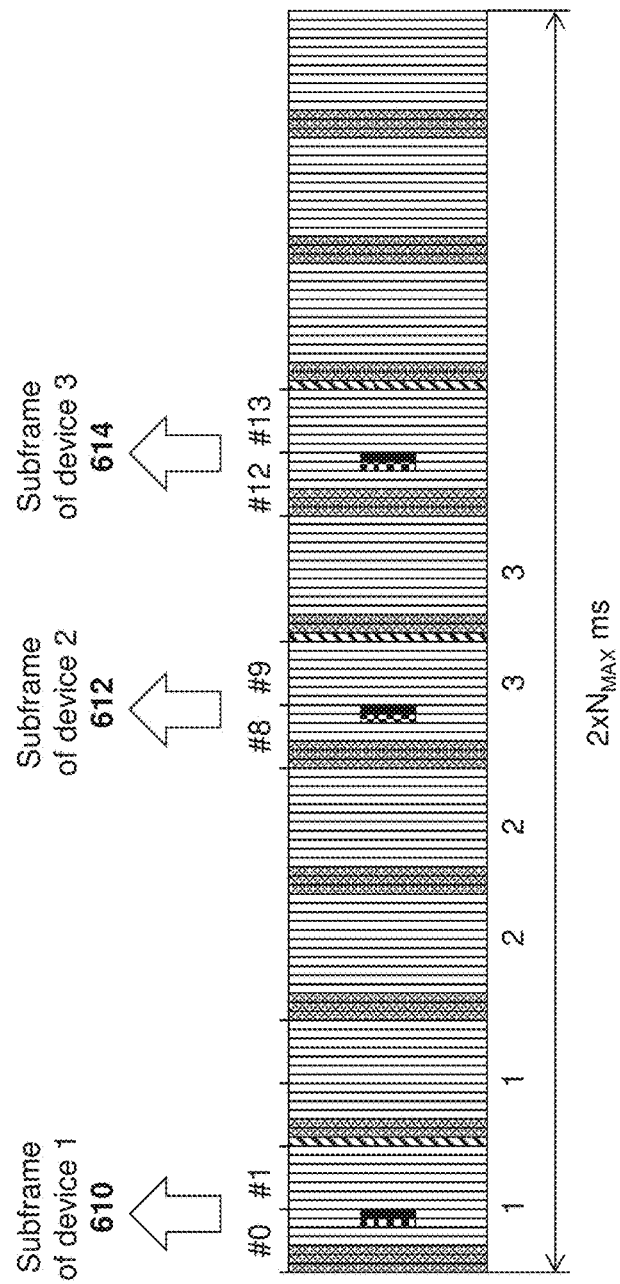
FIG. 6 is a block diagram showing a plurality of radio frames for different devices.

From the point of view of an entire cluster, the frame structure is shown with regard to FIG. 6, where the presence signal and the corresponding ACK of three devices are illustrated. In particular, as seen as in FIG. 6, the subframe 610 is used for a first device to transmit, subframe 612 is used for a second device to transmit, and subframe 614 is used for third device to transmit.

The primary presence signal of FIGS. 5 and 6 can reuse the construction of an existing LTE sequence d(n) defined for the primary synchronization signal. To avoid confusion with PSS sent by base stations, different values may be chosen for the Zadoff-Chu root sequence index u when used for device-to-device communication. One example is to choose alternative indices values as a set of different u values for device-to-device communication. For example, indices values of 40, 41, 23 may be used in one embodiment.

The reuse of existing PSS structures for the purpose of D2D communication further has the benefit of minimizing device implementation since devices are adapted to decode such existing PSS signals and thus receiving circuitry on the device may stay the same.

For secondary presence signals, these signals may reuse the construction of an existing LTE sequence d(n) defined for the secondary synchronization signal. To avoid confusion with the SSS of base stations, the value of the indices ($m_0$, $m_1$) can be chosen differently for the device-to-device communication.

The ACK/NACK can be transmitted reusing existing LTE physical hybrid acknowledgment repeat request (HARQ) indicator channel (PHICH) construction. After repetition coding, a block of binary phase shift keying (BPSK) modulation symbols z(0), ..., $z(M_s-1)$ may be symbol-wise multiplied with an orthogonal sequence and scrambled, resulting in a sequence of modulation symbols d(0), ..., $d(M_{symb}-1)$ according to $$d(i) = w(i \bmod N_{SF}^{PHICH}) \cdot (1-2c(i)) \cdot z(\lfloor i/N_{SF}^{PHICH} \rfloor) \quad (1)$$

The parameters $M_s$, $M_{symb}$, $N_{SF}^{PHICH}$ are reused from the LTE definition. The cell-specific scrambling sequence c(i) is fixed for the purpose to responding to PS. The orthogonal sequence w(i) is also fixed, e.g., [+1 +1 +1 +1]. Further, due to a design feature of PHICH, multiple ACK/NACKs can be multiplexed together. This can be useful whenever multiple ACK/NACK (or multiple ACKs) are to be sent. For example, this may occur if: the PS of two devices (separate either in time or frequency) are responded to in a same TS to save resources for sending ACK; or when there is a need to send ACK/NACK to both PS and data packets, when PS and data packets coexist after the initial network establishment is done. In this case, two or more sets of ACK/NACK (or ACK alone) can be combined for transmission, with each set using a different orthogonal sequence w(i), e.g., [+1 +1 +1 +1] and [+1 −1 +1 −1]. A rule can be specified to predefine the mapping between a transmission (PS or data packet) and a PHICH transmission.

Figure 7:
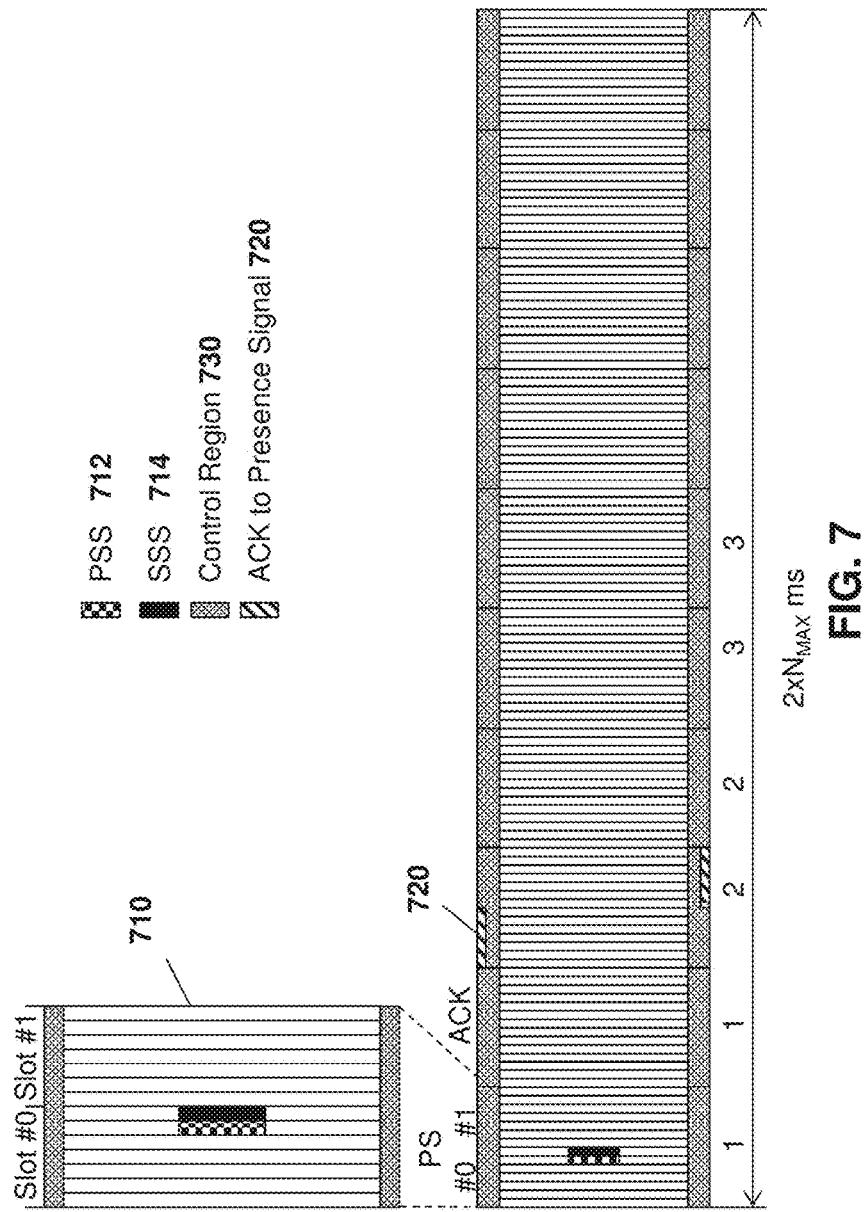
FIG. 7 is a block diagram showing an SC-FDMA radio frame for transmitting a primary synchronization signal, a secondary synchronization signal, and acknowledgements.

In a further embodiment, devices may use SC-FDM instead of OFDM to modulate the signal. In this case, the frame structure is shown from the point of view of a first device in FIG. 7. As seen in FIG. 7, the PSS 712 and SSS 714 are transmitted during a subframe 710, and the acknowledgement 720 may be provided in a control region 730.

Thus, the same PSS, SSS design indicated above for OFDM can also be used in SC-FDM transmission without change. For the ACK/NACK, the physical uplink control channel (PUCCH) type of transmission may be used instead.

Device Process

Figure 8:
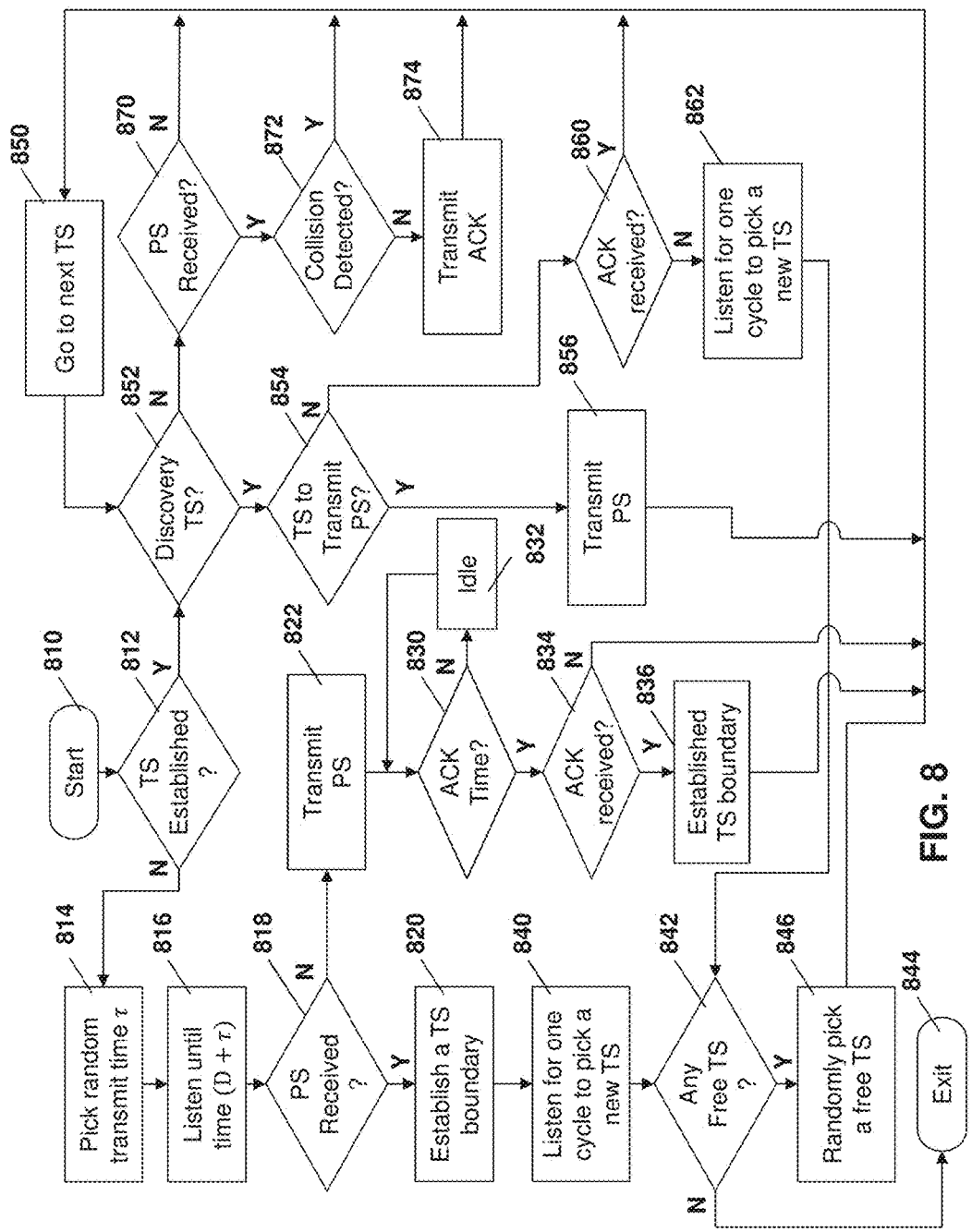
FIG. 8 is a process diagram showing a device process for implementing one embodiment of the present disclosure.

The above may be implemented in accordance with the embodiment of FIG. 8. In particular, the process of FIG. 8 starts at block 810 and proceeds to block 812 in which a check is made to see whether a TS has yet been established for the device. If no, the process proceeds to block 814 in which a random contention time τ is picked and the process then proceeds to block 816 in which the device listens for a time period designated as D+τ where D is the discovery period (frame period) length. Here 'listen' refers to the function where a device performs detection of a potential signal, to see if such a signal has been transmitted. Similarly, this may be referred to as a device 'checks' for the potential signal.

In particular, at the initial stage when no TS has yet been established, all devices initiate to form a cluster. The main goal at this stage is to establish a TS boundary so that devices can find a TS to transmit the PS. In accordance with the embodiment of FIG. 8, a first collision free PS establishes the TS boundary, which then becomes a reference boundary for all devices to line up their TSs.

Figure 9:
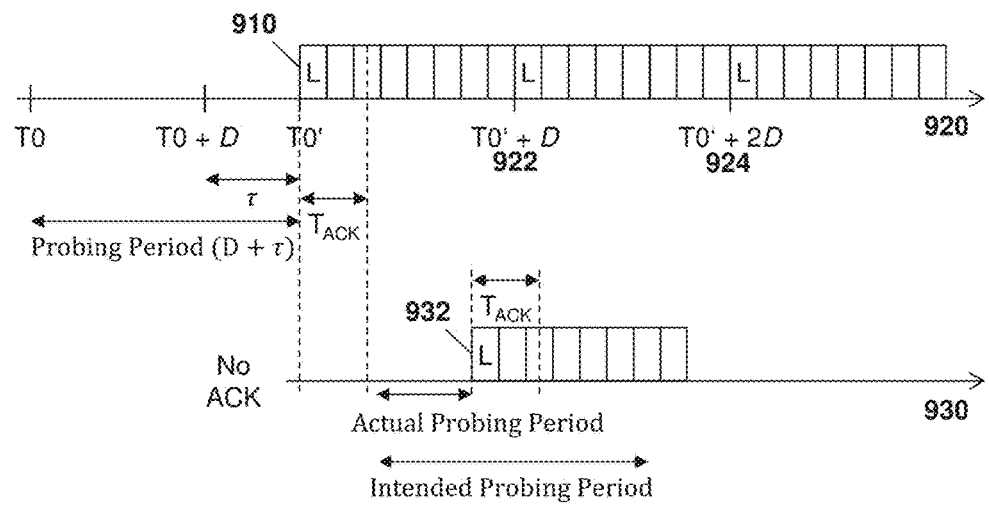
FIG. 9 is a block diagram showing the setting of a time-slot boundary.

This is shown with reference to FIG. 9. In particular, as seen in FIG. 9, a device starts at a device chosen time, labeled T0, and listens for a discovery time D, which corresponds with the discovery period (frame period), plus the randomly picked contention time τ. In this case, τ is chosen to be uniformly distributed between 0 and D.

As seen in FIG. 9, at the time T0+D+τ, labeled T0', the device has not detected a signal from another device, and the device therefore transmits a PS to initiate the TS boundary, as shown with reference 910.

The device then listens for an acknowledgement. If an acknowledgement is received to PS transmission 910, then the device establishes the TS slot boundary and continues along timeline 920 to periodically transmit its signal at a time T0'+XD, where X is a positive integer, as shown by reference numerals 922 and 924.

Conversely, if no acknowledgement is received to the PS transmitted at reference 910, then the device follows timeline 930.

In the embodiment of FIG. 9, timeline 930 shows the embodiment where the device starts a new probing period of length D+τ where the contention time τ is a newly picked randomly value between 0 and D. In this case, the device detects a PS signal 932 transmitted by another device and aligns its TSs to the TS slot boundary established by another device. The device abandons its listening for the remainder of its probing period, and switches to the mode of selecting one of the free TSs to transmit its PS. After $T_{Ack}$ duration the device sends acknowledgement to PS signal 932.

Referring again to FIG. 8, the above is shown with regard to blocks 814 and 816, in which the device listens for a time D+τ.

The device then checks at block 818 whether or not a presence signal has been received during the listening time period. The check at block 818 may need to be performed continuously during the entire listening time.

From block 818, if a PS is received, then the process proceeds to block 820 and a TS boundary is established.

Conversely, from block 818 if no PS is received, the process proceeds to block 822 in which the device itself transmits its PS to try to establish TS boundaries. The process then proceeds to block 830 in which a check is made to determine whether the acknowledgement time has yet occurred. If not the process proceeds to block 832 in which the device stays idle until, at block 830, it is found that the acknowledgement time has arrived. At this point, the process proceeds to block 834 in which a check is made to determine whether an acknowledgement has been received. If an acknowledgement has been received, then the process proceeds to block 836 in which a TS boundary is established.

The broadcast of the PS at block 822 or with regard to message 910 of FIG. 9, may include a system frame number (SFN) in addition to, or concurrently with a PSS and/or SSS. The SFN may be broadcast to track the number of discovery periods (frame) that had elapsed where the SFN may be set to 0 for a first transmission.

After establishing the TS boundary, the device that established the TS boundary may periodically broadcast the PS and the SFN on a first TS of every discovery period. The SFN may be incremented by 1 for each frame.

However, if the device does not receive the ACK in response, it assumes there has been a partial or total collision of PS transmission with other devices, or there was no other device around. Thus, the TS boundary is not established and the device has to start probing the channel all over again to see if some other device has successfully established the TS boundary.

The random contention time τ may be different for each TS boundary creation attempt to avoid collisions with other devices.

In some embodiments, if the device cannot establish or find a TS boundary after K attempts, the device aborts the transmission as it concludes that there is no other device in the coverage area to establish a D2D network.

Once the TS boundaries are established, the device can then look for a TS to transmit in. Thus, referring again to FIG. 8, if the PS is received and a TS boundary exists as shown by block 820, the device then proceeds to block 840 and listens for one discovery cycle to determine a new TS to transmit its PS. Thus, the device can listen and determine whether it sees any empty TSs (i.e., free TS). At block 842 a check is made to determine if any free TSs exists and if not, the process ends at block 844 since the cluster is full.

Conversely, at block 842 if there is a free TS detected then the device may randomly pick a free TS as shown with block 846. From block 834 if no ACK is received, or from block 836 or block 846 the process proceeds to block 850 in which the device moves to the next TS for an action.

From block 850, the process proceeds to block 852. Similarly, if a TS has been established previously as shown in the check of block 812 then the process may proceed directly to block 852. At block 852, a check is made to determine whether the current TS is a discovery TS for the device. In particular, the check at block 852 determines whether the TS is used for the device to transmit the PS or to receive an ACK. If yes, the process proceeds to block 854 in which a check is made to determine whether the TS is the time-slot used to transmit the PS.

From block 854, if the TS is for transmitting a PS, the process proceeds to block 856 in which the PS is transmitted and the process then proceeds to block 850 in which the device goes to the next TS.

Conversely, from block 854, if the TS is not the time-slot used to transmit the PS, then a check is made to determine whether an ACK was received at block 860. If an ACK is received then the process proceeds to block 850 in which the process goes to the next TS. Otherwise, if no ACK is received then the device may have had a collision and the process proceeds to block 862 in which the device listens for one cycle to pick a new TS. The process then proceeds to block 842 in which a check is made to determine if there are any free TSs and if no the process ends at block 844. If there are free TSs, then the device randomly picks a free TS at block 846 and then proceeds back to block 850 in which the process proceeds to the next TS.

From block 852, if the TS is not the one designated for the device to transmit the PS or to receive an ACK then the process proceeds to block 870 in which a check is made to determine whether a PS has been received in that TS. If yes, a check is made to determine whether a collision exists as shown by block 872. If a collision exists then the process goes to the next TS at block 850.

If no collision is found at block 872 then the process proceeds to block 874 in which an ACK is transmitted. As will be appreciated, the ACK transmission at block 874 may be done in several subframes in the future in order to ensure ACK timing as is provided above.

Thus, in accordance with the above, when a device detects a presence signal in a probing period, the device recognizes that the TS boundary has been established and the device then needs to listen to the channel to detect pre-existing presence signals. The probing period could be one or more integer multiples of the discovery cycles period, if each device transmits in each discovery cycle, then only one cycle needs to be listened. However, if as indicated above, a device transmits once every multiple cycle then that multiple needs to be listened to in order to ensure the free TS.

The listening for the TS boundary and for TSs allows the device to align with the time-slots partitioning in each discovery period and derive all occupied and available time-slots. The number of time-slots that are occupied means that there are that number of UEs already established in such discovery period.

The selection of a time-slot to attempt a PS transmission may be random within available TSs to avoid having two devices that are looking to join the network to collide by choosing a specific time-slot. In other words, of the remaining time-slots available, the device randomly picks one of the time-slots that is available to enhance the chances of avoiding a collision.

The process of FIG. 8, and in particular the action at block 874, allows the device to either transmit an ACK or transmit nothing. Thus, there are two states, ACK and discontinuous transmission (DTX).

In an alternative embodiment, three possible responses are available. In this case, an ACK, NACK or DTX may be used. However in such case it may be difficult since a device does not know whether or not another device will transmit in a particular time-slot or not and thus, if no PS signal is detected, the receiving device may have no way to tell whether either nobody transmitted a PS or the transmitted PS was not received properly, for example due to channel conditions, or two devices transmit a PS at the same time and collided, thus creating interference. In this case, not sending a NACK may improve system performance.

Figure 10:
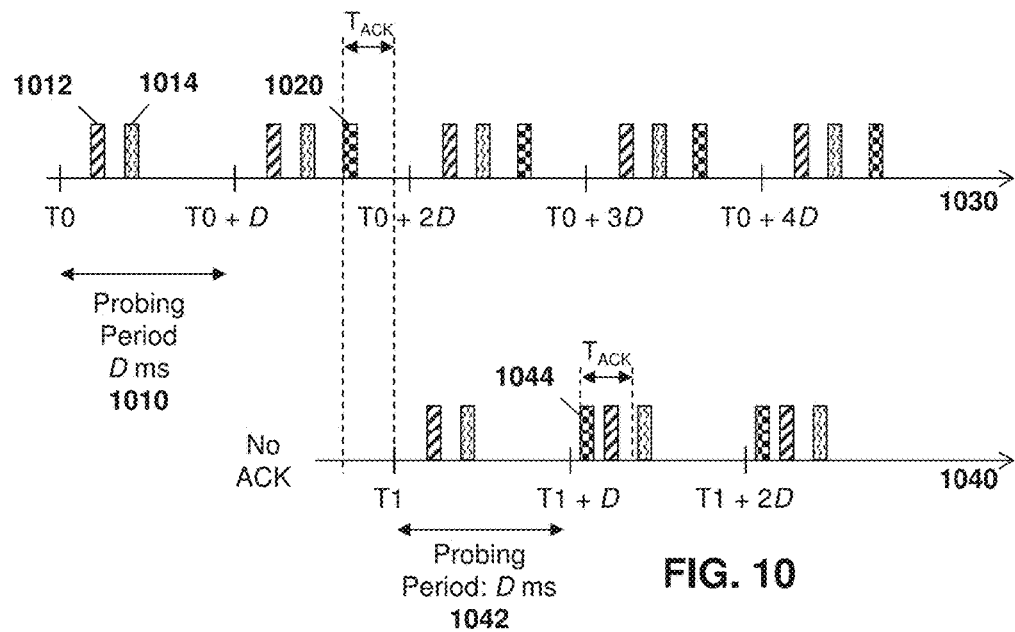
FIG. 10 is a block diagram showing the selection of an unused time-slot.

Reference is now made to FIG. 10 which shows the selection of the TS in accordance with the process of FIG. 8.

In particular, a device has a probing period 1010 of length D in which it detects PS signals 1012 and 1014.

At the end of probing period 1010 the device randomly picks a free TS and transmits in the selected TS, as shown by reference 1020. The device then listens for ACKs after a predetermined duration $T_{Ack}$ and if an ACK is received then the device proceeds along the time line 1030 in which the same TS is then selected for the device and the device continues to transmit in that TS for each discovery period.

If no ACK is received after the $T_{Ack}$ duration for the corresponding PS transmitted at reference 1020, the device proceeds along timeline 1040. On this timeline, a new probing period 1042 of length D is started and at the end of the probing period a free TS is randomly selected. In this case, a transmission 1044 may be made and an ACK listened for. If an ACK is received after the $T_{Ack}$ duration, then the device secures the TS and continues to transmit its PS in the TS during each subsequent discovery period.

Figure 11:
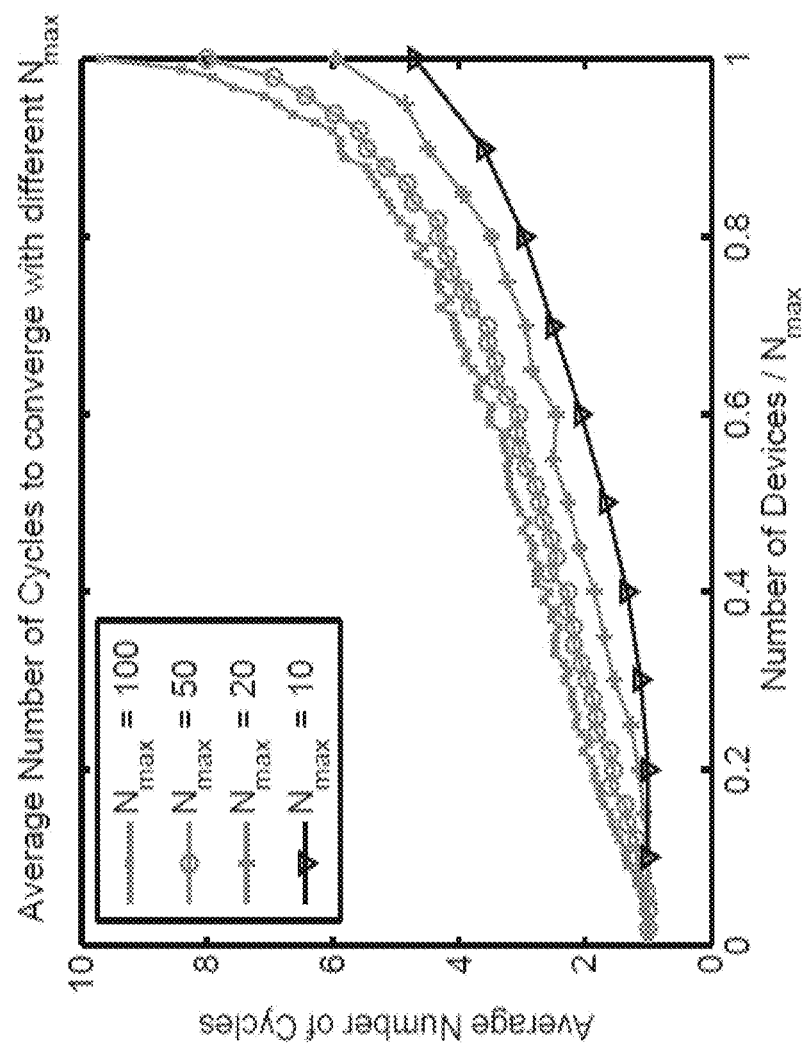
FIG. 11 is a plot of the convergence of a plurality of networks having different numbers of devices and different numbers of maximum devices.

Referring to FIG. 11, simulation of the above in order to determine how long a system takes to converge to a stable state wherein a UE reserves its own time-slot for discovery is shown with regard to the number of devices and the average number of cycles. In the simulation, it is assumed that all UEs have a direct link to other UEs in the network, thus creating a fully connected cluster. The simulation abstracts for path loss and decoding errors into a link failure rate, and failure is assumed to be 0. Other simulations where the link failure is not 0 are described below.

Four scenarios were simulated, namely $N_{max}$ being 10, 20, 50 and 100. For each value of $N_{max}$, the network was simulated with various numbers of devices from 2 to $N_{max}$. Multiple runs were made for each value and the average was taken for convergence. In the simulation, all UEs were initially unsynchronized. The network convergence means that all devices have aligned to the same TS boundary and that each device has secured a contention-free time-slot to transmit its PS.

As seen in FIG. 11, the increase in the number of devices leads to an increase in the number of cycles required to reach convergence. However the increase is linear when the ratio of the number of devices to the total number of time-slots is low. As the ratio of the total number of devices to the total number of time-slots approaches 1 then the increase is more exponential since the likelihood of PS collision between devices increases exponentially as well. Also, it can be observed that for a fixed ratio of the total number of devices to the total number of time-slots, the network convergence time is longer for the network with more devices. This means that larger networks require longer times to converge.

Network with Link Failures

The above embodiments assumed that the network is operating under ideal conditions and with the assumption that the network was fully-connected. In other words, the above assumed a direct error-free link from one device to any other device in the network.

In accordance with one embodiment of the present disclosure, the above assumptions are relaxed by allowing links to have a certain failure rate. This means that when a PS signal is transmitted, there is a possibility that it may not be decodable by some devices in the network.

The removal of the assumption of a direct, error free link leads to two main issues. A first is multiple TS boundaries (multiple leader devices) in the network, and a second is a stochastic hidden node problem. In accordance with the present embodiment, the process from FIG. 8 is modified to accommodate these issues.

Further, if a re-designed process is robust to link failure on ACK links, it may also be robust enough to an occurrence of an ACK total cancellation due to signal superposition.

The first issue in accordance with the above is multiple TS boundaries due to link failures. This issue arises when a TS boundary is being established. When a device transmitting is the first one whose presence signal is used as a reference to establish the TS boundary, the device that transmits such signal is called the leading device or the leader. As link failures may occur during that first transmission, some devices may not receive the PS signal. As a result, one of those devices may transmit its own PS signal to establish a separate TS boundary among a subset of devices, and thus become a second leader.

Figure 12:
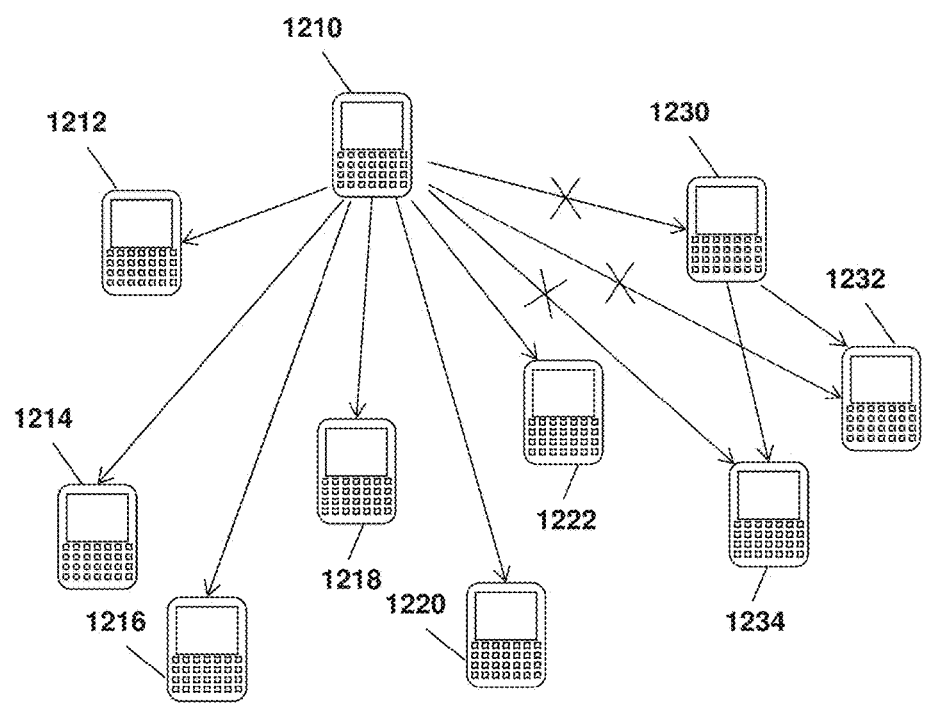
FIG. 12 is a block diagram showing time-slot boundary misalignment.

Reference is now made to FIG. 12. As seen in FIG. 12, a first leader 1210 establishes a first TS boundary among various devices, such as devices 1212, 1214, 1216, 1218, 1220 and 1222.

A second device 1230 misses the TS boundary establishment from leader 1210 and thus transmits a PS signal to establish a TS boundary. Devices 1232 and 1234 also missed the original TS boundary signal from device 1210 and therefore use the TS boundary as provided by device 1230.

In order to overcome having two TS boundaries within the cluster or network, one option is to reset a network once the misalignment of the TS boundary is discovered. This can be done by designating a RESET signal on the PS channel so that a device can notify other devices when it experiences TS boundary misalignment. In one embodiment, the RESET signal could be a PS signal with a special SSS sequence, for example.

In the example of FIG. 12, device 1222 detects signals from both leader 1210 and leader 1230 and realizes that there is a TS boundary misalignment between the two. Thereafter, device 1222 transmits a reset signal and further resets itself.

Similarly, device 1234 can detect the TS boundary misalignment when it receives PS signals for devices under leader 1210 and it may also transmit a reset signal on its PS channel for the duration of one cycle.

In some cases, the reset may be performed on a particular network. For example, a smaller network may be reset rather than a larger network in order to avoid convergence issues with larger networks. In other cases, groups or networks that have higher priority data payloads may request the other network with the TS boundary misalignment reset itself instead. In other cases both networks may reset themselves to start the entire process over. Once a reset is received, the process of FIG. 14 may be restarted and the process of FIG. 15 may be used to re-establish a new TS boundary.

The second issue caused by the random link failures described above relates to a stochastic hidden node problem. Two scenarios for such hidden node problems exist. A first occurs when two devices pick the same TS to transit their PS at the very first attempt. The second occurs when one device is already transmitting its PS on a time-slot, but due to the link failure a new device may not detect the existing PS and may pick the same TS to transmit its own PS.

Figure 13:
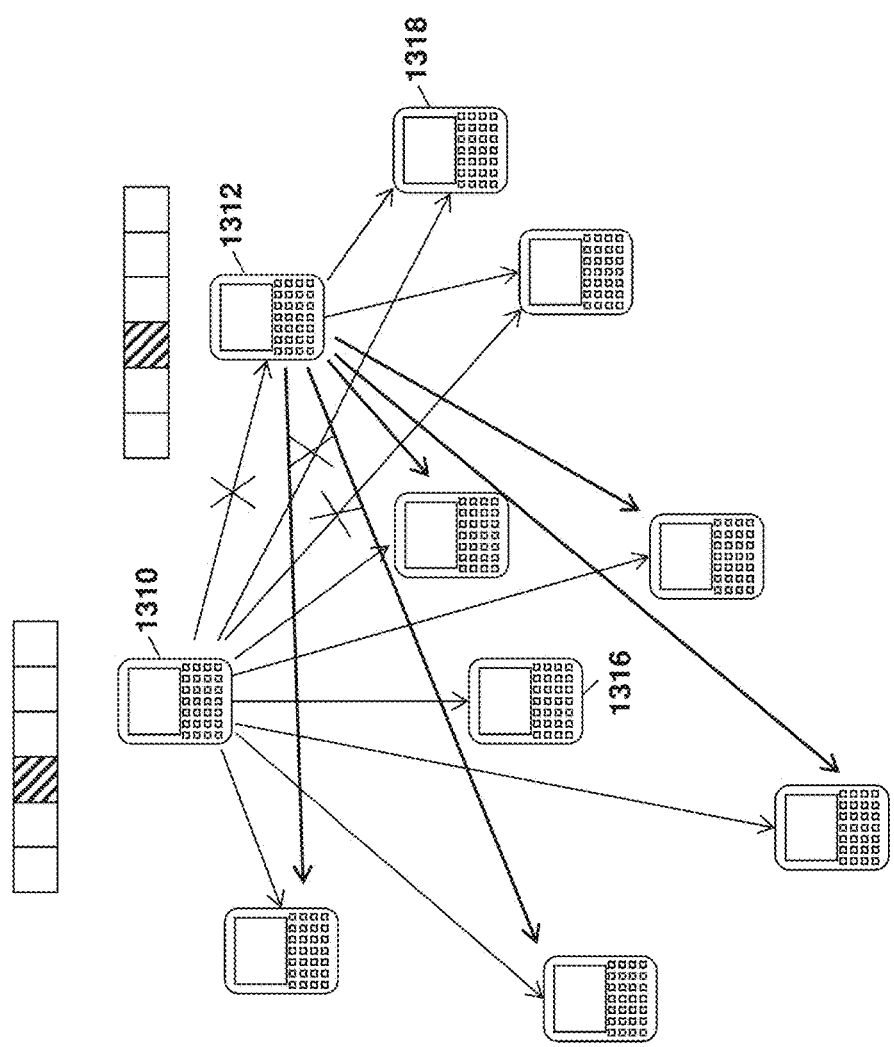
FIG. 13 is a block diagram showing a stochastic hidden node problem.

The consequence of both scenarios is that a first device and a second device collide but the collision may never be resolved due to random link failures in the network. Specifically, as shown with regard to FIG. 13, where a first device 1310 and a second device 1312 both transmit, there are some devices such as device 1316 and device 1318 that only receive signals from one of the transmitters. In other words, device 1316 may receive a signal only from device 1310 and device 1318 may receive a signal only from device 1312 in the example of FIG. 13.

Although other devices in the network experience the collision between the signals of device 1310 and device 1312 and do not send an ACK, device 1316 will send an ACK to device 1310 since it only received the signal from device 1310. Similarly, device 1318 will send an ACK to device 1312 since it received a signal only from device 1312.

Devices 1310 and 1312 will receive ACK signals and believe that they have secured a TS. The devices 1310 and 1312 will never know about the collision and will therefore never jump to a new TS to avoid the collision.

In order to overcome the above, one solution is based on the observation that wireless links undergo independent quasi-static fading, whereby any receiving device will experience a mixture of the correct PS signals, corrupted PS signals and missed signals over a number of cycles. The enhanced capability of detecting the collision of PS signals is enabled by the use of SSS signals as a secondary presence signal. When two or more SSS signals combine, such signals can be detected and a count of the presence of multiple devices on the same time-slot be made. Based on this, one embodiment of the present disclosure provides for a "TS Confidence Level" in order to determine whether the UE should stay in its TS or move to another TS.

In one embodiment, a TS Confidence Level may be designed for time-slots on both the transmitter and receiver sides. At the receiver side, in accordance with one embodiment, the receive TS confidence level of a TS is increased by one unit when a single PS signal is received in the TS. The receive TS confidence level of a TS decreases by one unit when more than one signal is received or more than one SSS signals are detected in that TS. If the receive TS confidence level of a TS is larger than a pre-defined receive TS confidence threshold, an ACK signal will be sent out upon receiving a correct PS signal in that TS.

Similarly, at the transmitter side, the transmit TS confidence level of a TS increases by one unit if an ACK is received for the PS transmitted in that TS. Similarly, the transmit TS confidence level of a TS decreases by one unit if an ACK is not received for the PS transmitted on that TS. When the transmit confidence level is below a pre-defined threshold, the transmitter UE relinquishes its secured TS before moving to search for a new TS.

Over a window of several discovery periods, if the number of times a PS signal received in a given TS is significantly less than the number of times a PS signal is missing, the receiving devices can implicitly infer that collisions must have occurred on that TS. For example, if a link failure rate is 10% and two devices collide, the receiving device will detect combined PS signals of both colliding devices for 81% PS signal from either one of the colliding devices for 18% and no PS signals for 1% of the time. As such, in this stochastic hidden node scenario, all receiver nodes will eventually detect a collision with a higher probability as their receive confidence level decreases with time. Therefore, such devices will stop sending ACK signals back to colliding transmitters. After several counting periods, the colliding transmitters will not receive enough ACK signals, resulting in a low transmit TS confidence for their secured time-slot. Eventually such devices will move to select a new random TS in which to transmit.

When a device only experiences radio link failures but no collisions, then the number of PS signals received is significantly larger than the number of missed ones. For example, if the link failure is 10% and the receiving device will detect a PS signal for 90% of the time and no PS signals for 10% of the time. Therefore, the receive TS confidence level remains large enough for any receiver device to send an ACK signal back to the transmitter, even when there are some missing PS signals. As such, the present embodiment is robust to link failures.

Figure 14:
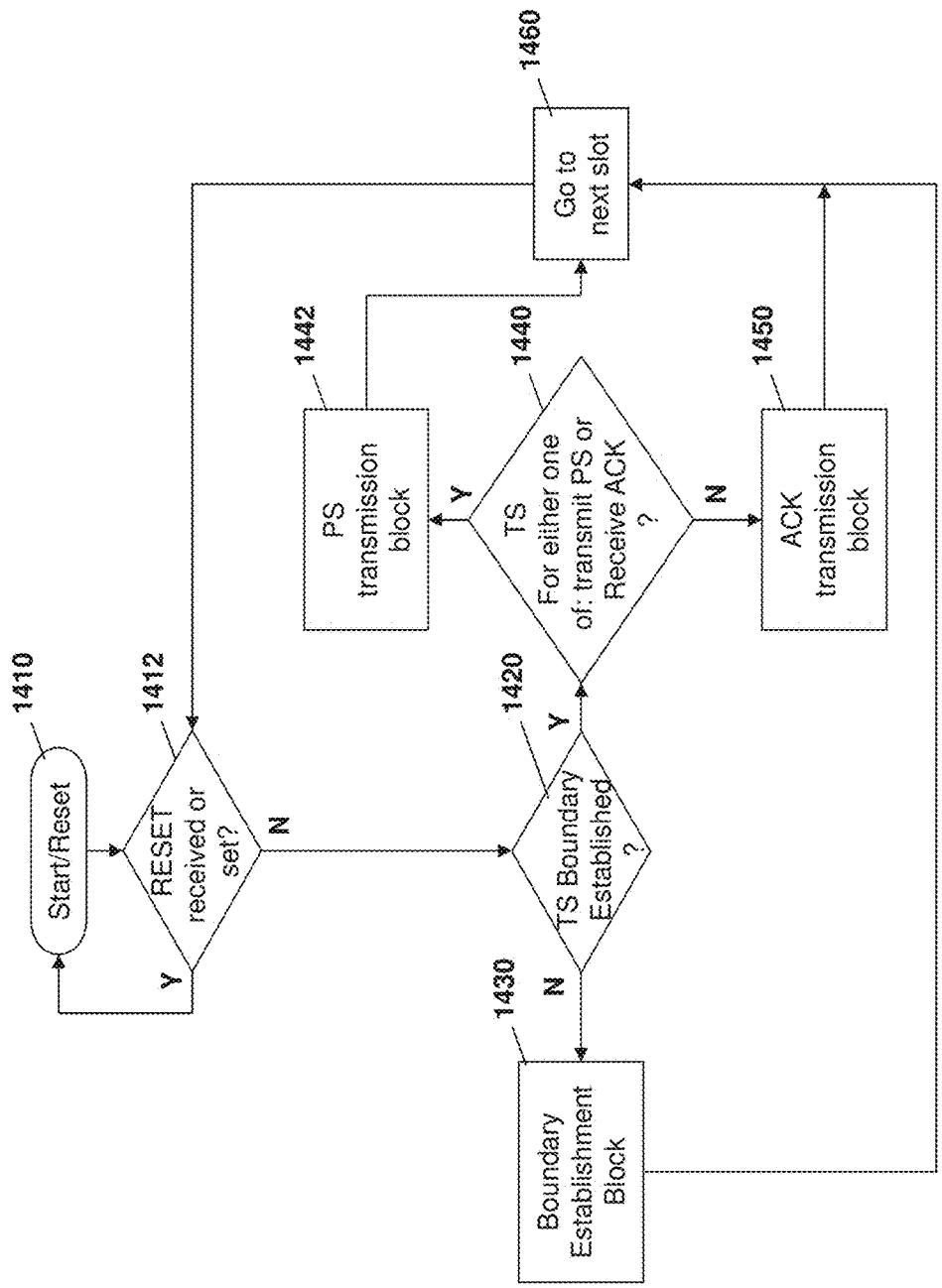
FIG. 14 is a process diagram showing a process for an embodiment where link failures are possible.

The above may be implemented, for example, with reference to the process of FIG. 14. As seen in FIG. 14, the process starts or resets at block 1410 and proceeds to block 1412 in which a check is made to determine whether a reset has been received. If yes, then the process proceeds back to block 1410 in which a reset occurs and then back to block 1412.

If a reset has not been received the process proceeds to block 1420 to determine whether or not a TS boundary has been established. If no, the process proceeds to a boundary establishment block 1430. One example of a boundary establishment block is found in regard to FIG. 15.

Figure 15:
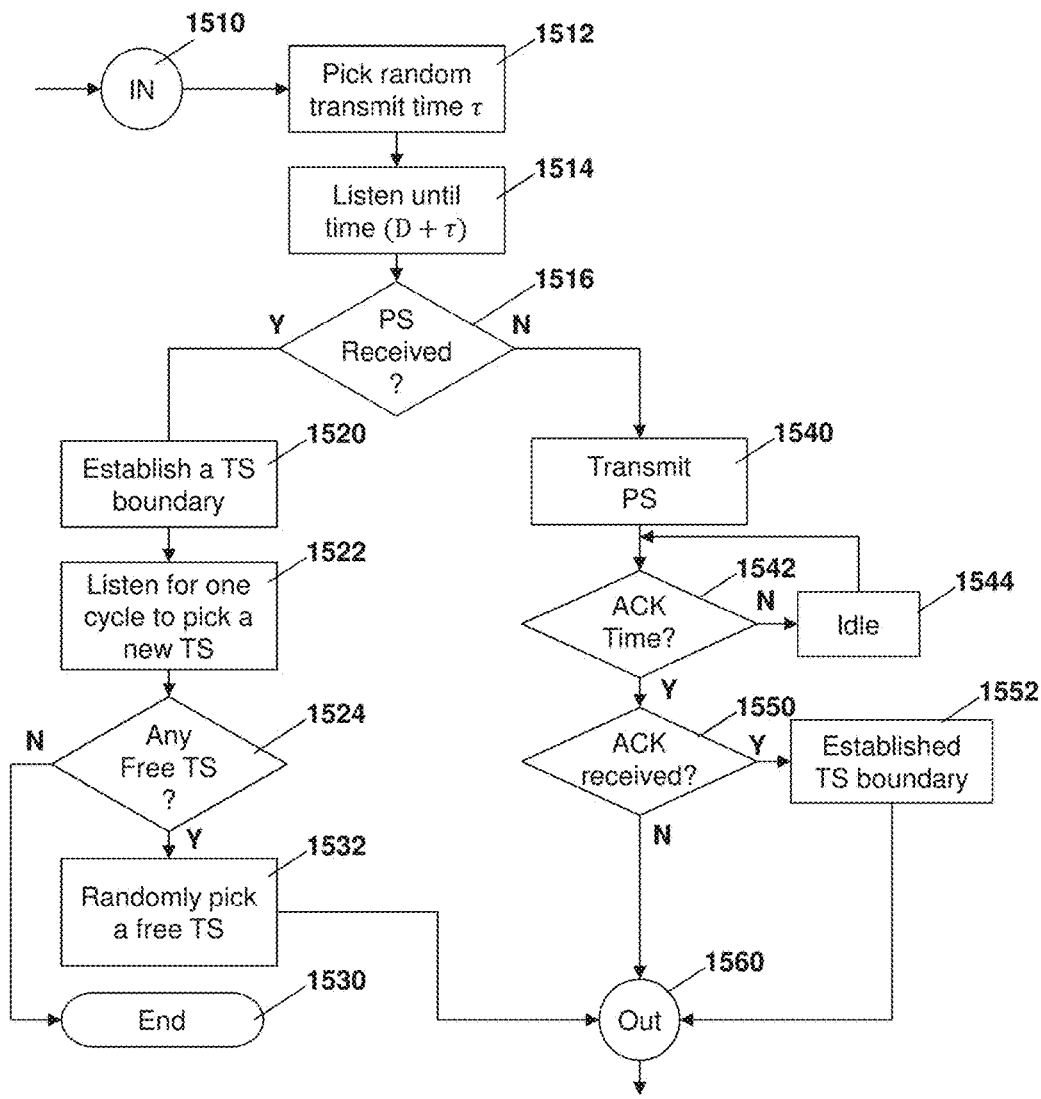
FIG. 15 is a process diagram showing functionality for an example boundary establishment block.

In particular, referring to FIG. 15, the process enters at block 1510 and proceeds to block 1512 in which a random contention time τ is picked. The process then proceeds to block 1514 in which the device listens until a time D+τ.

From block 1514 the process proceeds to block 1516 in which a check is made to determine whether a PS was received during the probing time D+τ. As will be appreciated by those in the art, the check at block 1516 is an ongoing check and could occur at any time during the D+τ time interval and does not need to wait until the end of the D+τ time interval.

From block 1516, if a PS is received then the process proceeds to block 1520 in which a TS boundary is established. The process then proceeds to block 1522 in which the device listens for one discovery cycle to pick a free TS and the process then proceeds to block 1524 in which a check is made to determine whether any free TS has been found. If no free TS was found in block 1524 the process proceeds to block 1530 and ends since there are no free TSs available for the device to communicate.

Conversely, if a free TS is found then the device proceeds to block 1532 in which a free TS is randomly chosen and the process proceeds to block 1560 in which the process leaves the boundary establishment block.

From block 1516 if a PS is not received during the probing time interval then the process proceeds to block 1540 in which the device itself transmits a PS in order to initiate a TS boundary.

The process then proceeds to block 1542 in which a check is made to determine whether the acknowledgement time has yet arrived. If no then the process proceeds to an idle block 1544 and then proceeds back to block 1542.

Once the acknowledgement time has arrived the process proceeds to block 1550 and checks whether or not an ACK is received. If yes, the process proceeds to block 1552 in which a TS boundary is established.

If from block 1550, the now ACK is not received, or after block 1552, the process proceeds to block 1560 in which the TS boundary establishment block is exited.

As will be appreciated by those in the art, if an ACK is not received at block 1550 then there is no TS boundary establishment at that time and the process would proceed back to block 1430 in FIG. 14.

Referring back to FIG. 14, once the boundary establishment at block 1430 has been exited, the process proceeds to block 1460 in which the device proceeds to the next TS.

From block 1460 the process proceeds back to block 1412 to check if a reset has been received or not.

During the check at block 1420, if the TS boundary has been established then the process proceeds to block 1440 in which a check is made to determine whether the current TS is either a transmit PS time-slot or a receive ACK time-slot (i.e. a discovery time-slot for the device). If yes then the process proceeds to block 1442 which is a PS transmission block. One example of a PS transmission block is shown with regard to FIG. 16.

Figure 16:
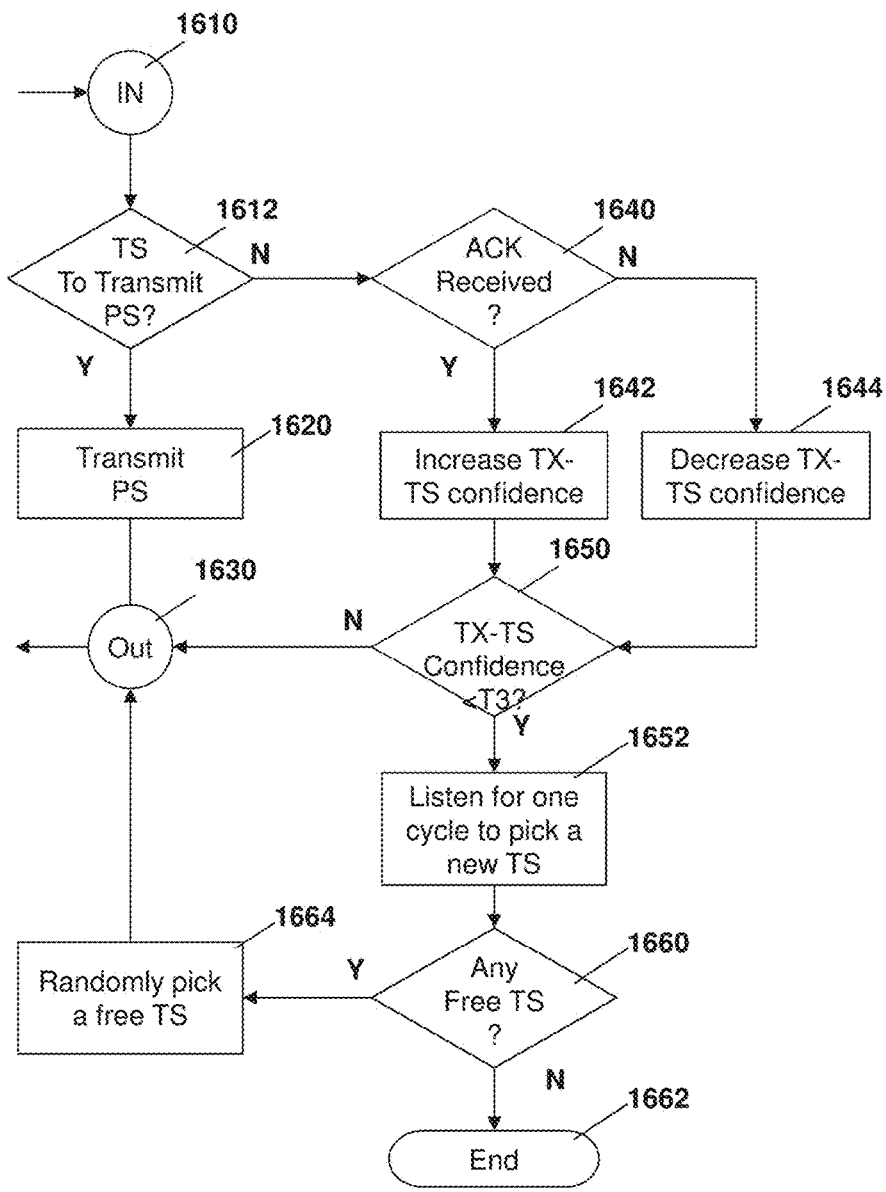
FIG. 16 is a process diagram showing functionality for an example PS transmission block.

In particular, referring to FIG. 16, the process begins at block 1610 and proceeds to block 1612 in which a check is made to determine whether the TS is used for transmitting a PS. If yes, the process then proceeds to block 1620 in which the PS is transmitted and the process then proceeds to block 1630 in which the PS transmission block is exited.

If the TS is not for transmitting the PS as determined at block 1612, the process proceeds to block 1640 in which a check is made to determine whether an ACK has been received at the device. If yes, the process proceeds to block 1642 and the transmit TS confidence is increased by one unit. Conversely, if no ACK has been received the process proceeds to block 1644 in which the transmit TS confidence is decreased by one unit.

The process then proceeds from block 1642 or block 1644 to block 1650 in which a check is made to determine whether the transmit TS confidence is less than a pre-defined threshold. If the transmit TS confidence is not less than the threshold then the device is confident regarding the TS selection and the process proceeds back to block 1630 and exits the PS transmission block.

Conversely, if the transmit TS confidence is below the threshold then the process proceeds from block 1650 to block 1652 where the device listens for one discovery cycle to pick a new free TS.

The process then proceeds to block 1660 in which a check is made to determine whether there are any free TSs. If not, the device proceeds to block 1662 and ends the process as there are no free TSs available for communication.

Conversely, if there are free TSs then the process proceeds from block 1660 to block 1664 in which a new TS is randomly picked from the available free TSs. From block 1664 the process proceeds to block 1630 and exits the PS transmission block.

Referring again to FIG. 14, once the process exits the PS transmission block the process then proceeds to block 1460 in which the device goes to the next TS and then back to block 1412 to check whether a reset has been received.

Figure 17:
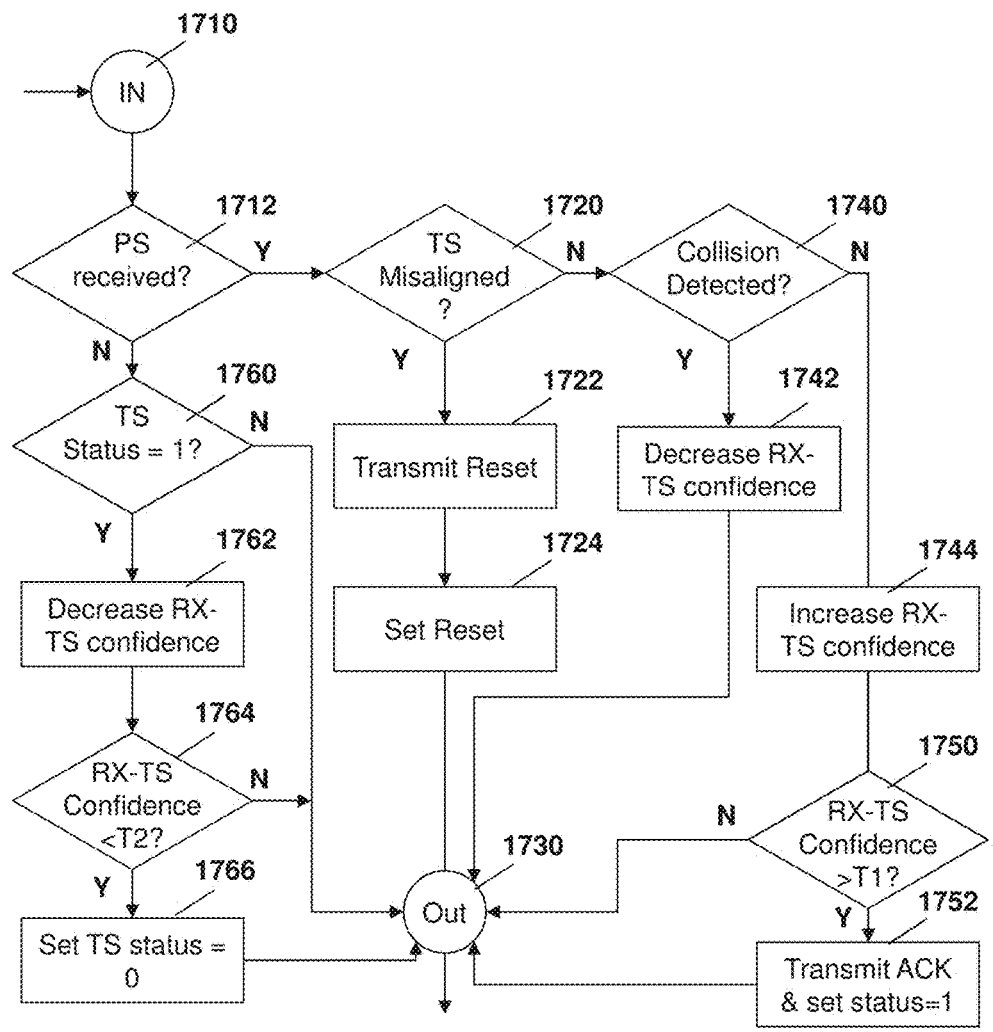
FIG. 17 is a process diagram showing functionality for an example acknowledgement transmission block.

From block 1440, if the TS is not the one used for transmitting the PS or receiving the ACK then the process proceeds to block 1450, which is an ACK transmission block. Reference is now made to FIG. 17, which shows one example of an ACK transmission block.

The ACK transmission block is entered at block 1710 and the process proceeds to block 1712 in which a check is made to determine whether a PS has been received in the TS. If yes, the process proceeds to block 1720 in which a check is made to determine whether the TS is misaligned. The misalignment of the TS may be detected for example, by receiving multiple PSs or PSs that have TS boundaries that are different than the TS established for the device.

The process proceeds from block 1720 to block 1722 if there is a misalignment. At block 1722, a RESET is transmitted by the device and the process then proceeds to block 1724 in which the device itself resets its TS boundaries.

From block 1724 the process proceeds to block 1730 and exits the ACK transmission block.

If the TS is not misaligned, as determined at the check of block 1720, the process proceeds to block 1740 in which a check is made to determine whether a collision has been detected in the TS. If a collision has been detected then the process proceeds to block 1742 in which the receive TS confidence is decreased by one unit and the process then proceeds to block 1730 and exits the ACK transmission block.

If a collision is not detected then the process proceeds to block 1744 in which the receive TS confidence is increased by one unit and the process then proceeds to block 1750 in which a check is made to determine whether the receive TS confidence is greater than a pre-defined threshold. If the receive TS confidence is not greater than the threshold the process proceeds to block 1730 and exits the ACK transmission block.

If the receive TS confidence is greater than the threshold as determined by block 1750 then the process proceeds to block 1752 in which the device transmits an ACK and sets its TS status to 1.

From block 1752 the process proceeds to block 1730 and exits the ACK transmission block.

If a PS is not received in the time-slot, the process proceeds from block 1712 to block 1760 in which a check is made to determine whether the TS status is 1. If no, the process proceeds to block 1730 and exits the ACK transmission block.

If the TS status is 1, the process proceeds from block 1760 to 1762 in which the receive TS confidence is decreased by one unit.

The process then proceeds to block 1764 in which a check is made to determine whether the receive TS confidence is less than a second pre-defined threshold. If no the process proceeds to block 1730 and exits the ACK transmission block.

However, if the receive TS confidence is less than the second threshold the process proceeds to block 1766 and sets the TS status to 0. From block 1766 the process proceeds to block 1730 and exits the ACK transmission block.

From the above, the setting of the time-slot status of FIG. 17 to one indicates confidence in the TS.

Referring again to FIG. 14, once the ACK transmission block at block 1450 is exited then the process proceeds to block 1460 in which the device proceeds back to the next TS.

Figure 18:
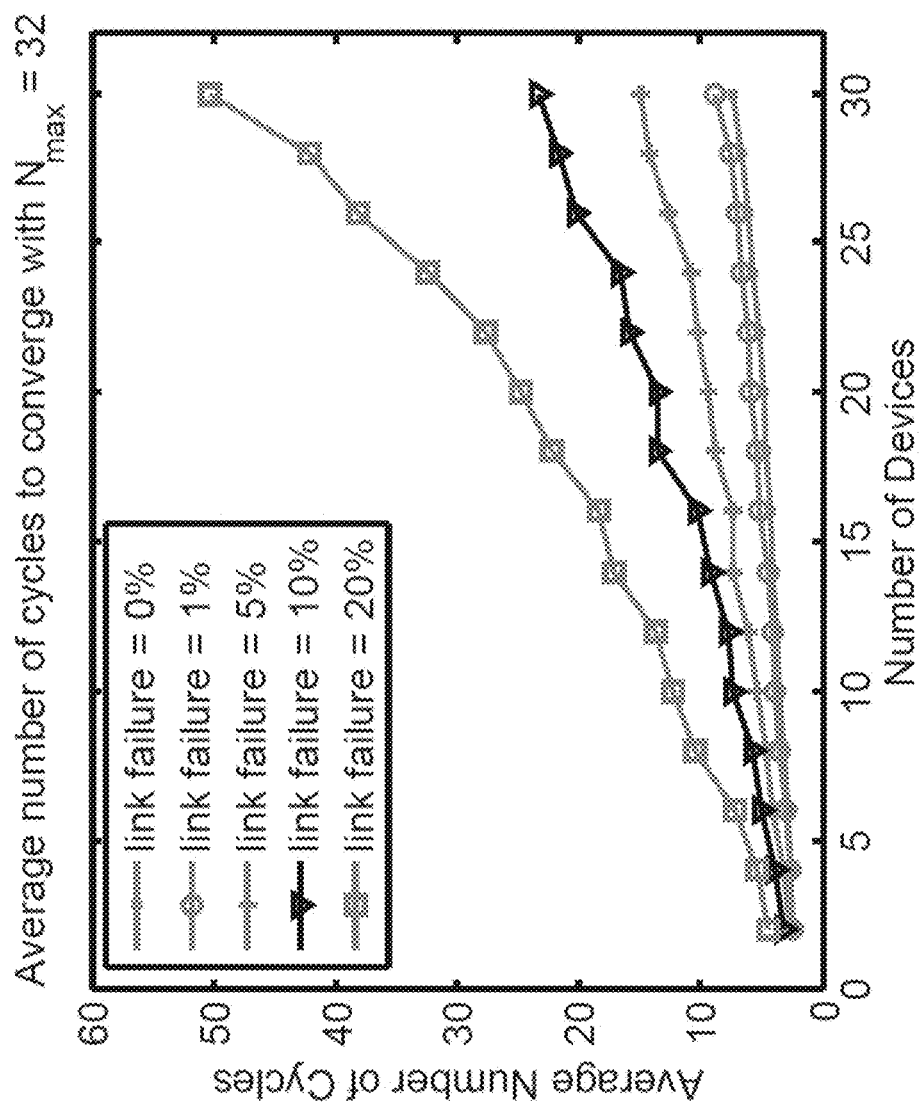
FIG. 18 is a plot of the convergence of a plurality of networks having different numbers of devices and different numbers of maximum devices.

Reference is now made to FIG. 18, which shows a plot of the time to reach convergence with $N_{MAX}$ set at 32 and the number of devices actually attempting to reach convergence varying from 2 to 32. As seen in FIG. 18, various link failure rates are provided and the number of cycles required for network convergence is shown. As can be seen, up to 10% link failure rates, the number of cycles for convergence linearly increases with the number of devices in the network. For 20% link failure rates, the linearity is broken down when the number of devices is more than 20. This is because high link failure rate creates a large number of stochastic hidden nodes and not enough time-slots for the devices to select from.

ID Selection

In a further embodiment, when convergence is achieved, all $N_{Max}$ number of time-slots or some of them may be occupied. Each device reserves one time-slot. Therefore, if there are enough devices in the local neighborhood, then the converged device state $M=N_{Max}$ number of devices are able to join the network. If there are not enough devices, such that $M<N_{Max}$, some time-slots remain empty. As each device is able to decode M−1 presence signals per discovery period, each device can count that there are M established devices. If the number of established devices does not change for two consecutive cycles of the discovery period, then all established devices assume that a converged state has been reached and an identifier selection process can be initiated in accordance with one embodiment.

To this end, all established devices select unique IDs from a pool of bits of binary codes. The pool may, for example, be $\lceil \log_2(M) \rceil$. The device transmitting on a first time-slot can select its identifier randomly by picking any $\lceil \log_2(M) \rceil$ bits of binary code and broadcast it on the same OFDM symbol that also carries its presence signal. All other M−1 devices receive the ID selected by the first device. The device that transmits on the second time-slot excludes the ID used by the first device and randomly picks another $\lceil \log_2(M) \rceil$ bits of binary code from the remaining pool. The third device excludes the IDs selected by the first two devices from its pool and the process continues until the last device selects and broadcasts its ID.

In this way each device receives a unique identifier to allow directed communications between devices.

Device Arrival and Departure

In a further embodiment, a device may leave a cluster. This can happen because the device is turned off or the device moves away from the peer devices or the user of the device deactivates D2D mode and thus will not transmit any D2D type signals.

When a device leaves, peer devices will detect that the device discovery signal is declining. When it drops below the thresholds as defined above, the peer devices determine that the device has left the cluster. If the PS signal on any time-slot is missing for, for example, three consecutive cycles, then the corresponding device is assumed to have departed. The number 3 is however only one example and other predefined numbers may be established.

If the first device that can establish a TS boundary needs to depart, then another established device in the network can be randomly assigned to transmit the SFN. Correspondingly, the leaving device may sense the weakening signalling strength of other devices in the group. When the reference signal received power (RSRP) of the cluster's PS is below a predefined threshold, the leaving device should stop transmitting the PS and detach from the cluster.

Any new device can join a network as long as the free time-slot is available within the discovery period. Each newly arriving device must first probe the channel for a full discovery cycle to learn the TS boundaries and available time-slots, and then transmit a PS on the available time-slot and wait for an ACK from other devices.

Adjusting the Periodicity of the Discovery Cycle

In a further embodiment, the periodicity of the discovery cycle may be adjusted. For example, when the network is in a state of convergence and the number of devices established is either much less than the total number of TSs per discovery period, or when the number of devices approaches the maximum number of devices in the maximum number of time-slots in the discovery cycle, the periodicity may be adjusted. Similarly, whenever a new device arrives or established device leaves a cluster then the periodicity might need to be adjusted.

The adjusting of the periodicity may be achieved by broadcasting adjustment, so that established devices collectively realign to the new discovery cycle, which could be larger or smaller.

To increase the probability that all devices become aware of the new periodicity, various options are possible. In one, a device may have a leader or master that determines new periodicity and that master may broadcast a message assigning the new periodicity at predefined TSs. The message may include a start time of the change.

A subset of the cluster members may echo the cluster master's message by repeating it. The subset of members may be, for example, those that have the lowest IDs. However, in some embodiments all members may repeat and in other embodiments the selection of the repeating cluster members may be chosen based on other criteria.

At the announced start time, all devices in the cluster then adjust to the new PS period.

The above may, for example, be implemented by changing the 3GPP TS 36.211 *"Evolved Universal Terrestrial Radio Access (E-UTRA); Physical channels and modulation"*, v. 11.3.0, June 2013, the entire contents of which are incorporated herein by reference. In particular, the bold section in Table 1 below may be added.

TABLE 1

Amendments to TS 36.211

3GPP 36.211
4   Frame structure
Downlink and uplink transmissions are organized into radio frames with
$T_f = 307200 \times T_s = 10$ ms duration. Three radio frame structures are supported:
- Type 1, applicable to FDD,
- Type 2, applicable to TDD.
- Type 3, applicable to device-to-device discovery and communication.
4.2   Frame structure type 3
For device-to-device discovery and communication, frame structure type 3 is used. In frame structure type 3, a subframe is a downlink or uplink subframe in reference to the transmitting device. A subframe is a uplink subframe in reference to the transmitting device, and a downlink subframe in reference the receiving device. At least one subframe for every $N_{max}$ subframes is a uplink subframe in reference to a given transmitting device, over which presence signal of the concerned transmitting device is transmitted. The parameter $N_{max}$ is configurable.
5.9   Presence Signals
For device-to-device discovery and communication, a UE transmits presence signal periodically. The presence signal a UE transmits contains a sequence that the UE selects from a predefined set of sequences.
The correct reception of a presence signal is acknowledged by a ACK/NACK sequence transmission.

The above may be implemented by any UEs. One exemplary device is described below with regard to FIG. 19.

UE 1900 is typically a two-way wireless communication device having voice and data communication capabilities. UE 1900 may have the capability to communicate with other UEs and in some instance to networks. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1900 is enabled for two-way communication, it may incorporate a communication subsystem 1911, including both a receiver 1912 and a transmitter 1914, as well as associated components such as one or more antenna elements 1916 and 1918, local oscillators (LOs) 1913, and a processing module such as a digital signal processor (DSP) 1920. As will be apparent to those skilled in the field of communications, the particular design of the communication subsystem 1911 will be dependent upon the communication system in which the device is intended to operate. The radio frequency front end of communication subsystem 1911 can be used for any of the embodiments described above.

If enabled for network connection as well as D2D connection, UE 1900 may have network access requirements that will vary depending upon the type of network. In some networks network access is associated with a subscriber or user of UE 1900. A UE may require a removable user identity module (RUIM) or a subscriber identity module (SIM) card in order to operate on a CDMA network. The SIM/RUIM interface 1944 is normally similar to a card-slot into which a SIM/RUIM card can be inserted and ejected. The SIM/RUIM card can have memory and hold many key configurations 1951, and other information 1953 such as identification, and subscriber related information.

When required network registration or activation procedures, if any have been completed, UE 1900 may transmit and receive communication signals over the network. Otherwise, network registration can occur in accordance with the embodiments above for a D2D network.

Signals received by antenna 1916 are input to receiver 1912, which may perform such common receiver functions as signal amplification, frequency down conversion, filtering, channel selection and the like. A/D conversion of a received signal allows more complex communication functions such as demodulation and decoding to be performed in the DSP 1920. In a similar manner, signals to be transmitted are processed, including modulation and encoding for example, by DSP 1920 and input to transmitter 1914 for digital to analogue conversion, frequency up conversion, filtering, amplification and transmission via antenna 1918. DSP 1920 not only processes communication signals, but also provides for receiver and transmitter control. For example, the gains applied to communication signals in receiver 1912 and transmitter 1914 may be adaptively controlled through automatic gain control algorithms implemented in DSP 1920.

UE 1900 generally includes a processor 1938 which controls the overall operation of the device. Communication functions, including data and voice communications, are performed through communication subsystem 1911. Processor 1938 also interacts with further device subsystems such as the display 1922, flash memory 1924, random access memory (RAM) 1926, auxiliary input/output (I/O) subsystems 1928, serial port 1930, one or more keyboards or keypads 1932, speaker 1934, microphone 1936, other communication subsystem 1940 such as a short-range communications subsystem and any other device subsystems generally designated as 1942. Serial port 1930 could include a USB port or other port known to those in the art.

Figure 19:
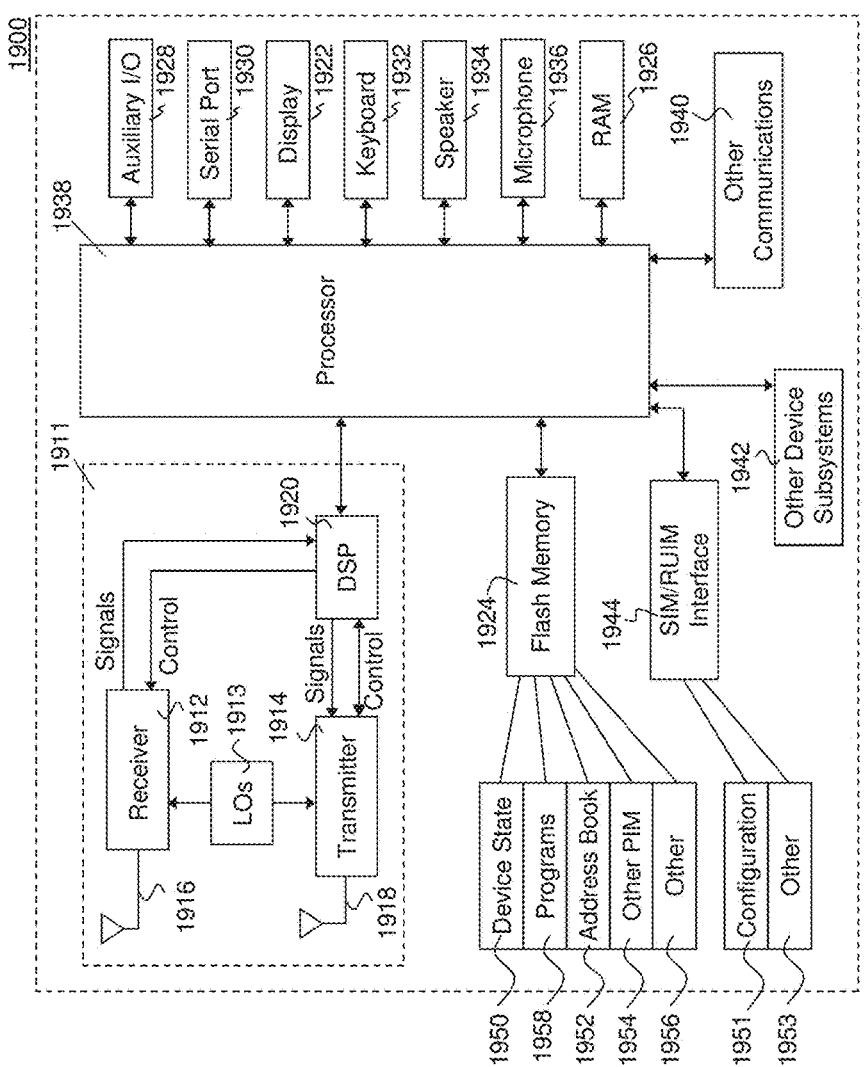
FIG. 19 is a block diagram of an example user equipment which may be used with the embodiments of the present disclosure.

Some of the subsystems shown in FIG. 19 perform communication-related functions, whereas other subsystems may provide "resident" or on-device functions. Notably, some subsystems, such as keyboard 1932 and display 1922, for example, may be used for both communication-related functions, such as entering a text message for transmission over a communication network, and device-resident functions such as a calculator or task list.

Operating system software used by the processor 1938 may be stored in a persistent store such as flash memory 1924, which may instead be a read-only memory (ROM) or similar storage element (not shown). Those skilled in the art will appreciate that the operating system, specific device applications, or parts thereof, may be temporarily loaded into a volatile memory such as RAM 1926. Received communication signals may also be stored in RAM 1926.

As shown, flash memory 1924 can be segregated into different areas for both computer programs 1958 and program data storage 1950, 1952, 1954 and 1956. These different storage types indicate that each program can allocate a portion of flash memory 1924 for their own data storage requirements. Processor 1938, in addition to its operating system functions, may enable execution of software applications on the UE. A predetermined set of applications that control basic operations, including at least data and voice communication applications for example, will normally be installed on UE 1900 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to transmit and receive data items. Further applications may also be loaded onto the UE 1900, for example through an auxiliary I/O subsystem 1928, serial port 1930, short-range communications subsystem 1940 or any other suitable subsystem 1942, and installed by a user in the RAM 1926 or a non-volatile store (not shown) for execution by the processor 1938. Such flexibility in application installation increases the functionality of the device and may provide enhanced on-device functions, communication-related functions, or both.

In a data communication mode, a received signal such as a text message or web page download will be processed by the communication subsystem 1911 and input to the processor 1938, which may further process the received signal for output to the display 1922, or alternatively to an auxiliary I/O device 1928.

A user of UE 1900 may also compose data items such as email messages for example, using the keyboard 1932, which may be a complete alphanumeric keyboard or telephone-type keypad, among others, in conjunction with the display 1922 and possibly an auxiliary I/O device 1928.

Such composed items may then be transmitted over a communication network through the communication subsystem 1911.

For voice communications, overall operation of UE 1900 is similar, except that received signals would typically be output to a speaker 1934 and signals for transmission would be generated by a microphone 1936. Alternative voice or audio I/O subsystems, such as a voice message recording subsystem, may also be implemented on UE 1900. Although voice or audio signal output is generally accomplished primarily through the speaker 1934, display 1922 may also be used to provide an indication of the identity of a calling party, the duration of a voice call, or other voice call related information for example.

Serial port 1930 in FIG. 19 would normally be implemented in a personal digital assistant (PDA)-type UE for which synchronization with a user's desktop computer (not shown) may be desirable, but is an optional device component. Such a port 1930 would enable a user to set preferences through an external device or software application and would extend the capabilities of UE 1900 by providing for information or software downloads to UE 1900 other than through a wireless communication network. The alternate download path may for example be used to load an encryption key onto the device through a direct and thus reliable and trusted connection to thereby enable secure device communication. As will be appreciated by those skilled in the art, serial port 1930 can further be used to connect the UE to a computer to act as a modem.

Other communications subsystems 1940, such as a short-range communications subsystem, is a further optional component which may provide for communication between UE 1900 and different systems or devices, which need not necessarily be similar devices. For example, the subsystem 1940 may include an infrared device and associated circuits and components or a Bluetooth™ communication module to provide for communication with similarly enabled systems and devices. Subsystem 1940 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a device for enabling a device-to-device wireless link, the method comprising:
   listening for a presence signal from another device on a channel for a first time period comprising a predetermined frame period; and
   transmitting a presence signal and system frame number on the channel to establish a time-slot boundary;
   wherein the transmitting of the presence signal enables another device to align to the established time-slot boundary.

2. The method of claim 1, wherein the first time period further comprises a randomly generated contention period.

3. The method of claim 1, wherein the frame period comprises an integer number of time-slot durations.

4. The method of claim 1, further comprising receiving, from another device, an acknowledgement related to the presence signal.

5. The method of claim 1, further comprising:
   receiving the presence signal from another device during the first time period; and
   omitting the transmitting step.

6. The method of claim 5, further comprising establishing the time slot boundary based on the received presence signal.

7. The method of claim 6, further comprising selecting a free time slot to communicate.

8. The method of claim 1, wherein the presence signal comprises a primary synchronization signal and a secondary synchronization signal.

9. A wireless device comprising:
   a processor; and
   a communications subsystem;
   wherein the processor and the communications subsystem cooperate to:
   listen for a presence signal from another device on a channel for a first time period comprising a predetermined frame period; and
   transmit a presence signal and system frame number on the channel to establish a time-slot boundary;
   wherein the transmitting of the presence signal enables another device to align to the established time-slot boundary.

10. The wireless device of claim 9, wherein the first time period further comprises a randomly generated contention period.

11. The wireless device of claim 9, wherein the frame period comprises an integer number of time-slot durations.

12. The wireless device of claim 9, wherein the processor and the communications subsystem further cooperate to receive, from another device, an acknowledgement related to the presence signal.

13. The wireless device of claim 9, wherein the processor and the communications subsystem further cooperate to:
   receive the presence signal from another device during the first time period; and
   omit the transmitting step.

14. The wireless device of claim 13, wherein the processor and the communications subsystem further cooperate to establish the time slot boundary based on the received presence signal.

15. The wireless device of claim 14, wherein the processor and the communications subsystem further cooperate to select a free time slot to communicate.

16. The wireless device of claim 9, wherein the presence signal comprises a primary synchronization signal and a secondary synchronization signal.

17. A non-transitory computer readable medium having stored thereon computer-executable code for execution by a processor of a wireless device, the code comprising instructions for:
   listening for a presence signal from another device on a channel for a first time period comprising a predetermined frame period; and
   transmitting a presence signal and system frame number on the channel to establish a time-slot boundary;
   wherein the transmitting of the presence signal enables another device to align to the established time-slot boundary.

18. The non-transitory computer readable medium of claim 17, wherein the first time period further comprises a randomly generated contention period.

19. The non-transitory computer readable medium of claim 17, wherein the frame period comprises an integer number of time-slot durations.

20. The non-transitory computer readable medium of claim 17, wherein the code further comprises instructions for receiving, from another device, an acknowledgement related to the presence signal.

21. The non-transitory computer readable medium of claim 17, wherein the code further comprises instructions for:
   receiving the presence signal from another device during the first time period; and
   omitting the transmitting step.

22. The non-transitory computer readable medium of claim 21, wherein the code further comprises instructions for establishing the time slot boundary based on the received presence signal.

23. The non-transitory computer readable medium of claim 22, wherein the code further comprises instructions for selecting a free time slot to communicate.

24. The non-transitory computer readable medium of claim 17, wherein the presence signal comprises a primary synchronization signal and a secondary synchronization signal.

* * * * *